US007577852B2

(12) United States Patent
Okazaki et al.

(10) Patent No.: US 7,577,852 B2
(45) Date of Patent: Aug. 18, 2009

(54) MICROPROCESSOR, A NODE TERMINAL, A COMPUTER SYSTEM AND A PROGRAM EXECUTION PROVING METHOD

(75) Inventors: Atsuya Okazaki, Ikoma (JP); Masaki Nakanishi, Nara (JP); Shigeru Yamashita, Kyoto (JP); Katsumasa Watanabe, Kyoto (JP)

(73) Assignee: National University Corporation Nara Institute of Science and Technology, Nara (JP)

( * ) Notice: Subject to any disclaimer, the term of this patent is extended or adjusted under 35 U.S.C. 154(b) by 823 days.

(21) Appl. No.: 11/182,049

(22) Filed: Jul. 13, 2005

(65) Prior Publication Data

US 2006/0161773 A1 Jul. 20, 2006

(30) Foreign Application Priority Data

Jan. 20, 2005 (JP) ............................. 2005-013190

(51) Int. Cl.
G06F 11/30 (2006.01)
G06F 12/14 (2006.01)
(52) U.S. Cl. ...................... 713/189; 713/164; 713/187
(58) Field of Classification Search ................ 713/164, 713/187, 189, 194
See application file for complete search history.

(56) References Cited

U.S. PATENT DOCUMENTS

| 5,841,869 | A  | * | 11/1998 | Merkling et al. ............ 713/164 |
| 5,892,899 | A  | * | 4/1999  | Aucsmith et al. ............. 726/27 |
| 5,987,232 | A  | * | 11/1999 | Tabuki .......................... 726/5 |
| 6,289,462 | B1 | * | 9/2001  | McNabb et al. .............. 726/21 |
| 6,308,270 | B1 | * | 10/2001 | Guthery ......................... 726/9 |
| 6,314,520 | B1 | * | 11/2001 | Schell et al. ................. 726/13 |
| 6,477,648 | B1 | * | 11/2002 | Schell et al. ................. 726/22 |
| 6,647,495 | B1 | * | 11/2003 | Takeuchi et al. ............ 713/189 |
| 6,651,171 | B1 | * | 11/2003 | England et al. ............. 713/193 |
| 7,020,772 | B2 | * | 3/2006  | England et al. ............. 713/166 |
| 7,055,040 | B2 | * | 5/2006  | Klemba et al. .............. 713/156 |
| 7,130,977 | B1 | * | 10/2006 | Christie et al. ............. 711/163 |
| 7,143,287 | B2 | * | 11/2006 | Bade et al. .................. 713/164 |
| 7,165,135 | B1 | * | 1/2007  | Christie et al. ............. 710/269 |
| 7,210,009 | B2 | * | 4/2007  | Gulick et al. ............... 711/159 |
| 7,305,554 | B2 | * | 12/2007 | Marquet et al. ............. 713/165 |
| 7,313,704 | B2 | * | 12/2007 | Kashiwada ................. 713/191 |
| 7,334,123 | B2 | * | 2/2008  | Gulick et al. ............... 713/160 |
| 7,356,668 | B2 | * | 4/2008  | Morais et al. ............... 711/211 |

(Continued)

OTHER PUBLICATIONS

Suh et al., Efficient Memory Integrity Verification and Encryption for Secure Processors, 2003, MIT.*

(Continued)

*Primary Examiner*—David García Cervetti
(74) *Attorney, Agent, or Firm*—Jordan and Hamburg LLP

(57) ABSTRACT

A node terminal including an internal memory for saving a program transmitted from a server, a CPU for executing the program, a hash value calculating section for performing an operation of the program using a specified hash function when the execution of the program is completed, and a digital signature executing section for digitally signing the program operated using the hash function and the execution result of the program, using a secret key peculiar to the node and saved in a secret key storage, and a microprocessor capable of guaranteeing that the content of a memory is not unjustly falsified during the execution of the program.

17 Claims, 24 Drawing Sheets

U.S. PATENT DOCUMENTS

| | | | |
|---|---|---|---|
| 7,386,890 B2* | 6/2008 | Galal et al. | 726/26 |
| 7,424,612 B2* | 9/2008 | England et al. | 713/167 |
| 7,444,523 B2* | 10/2008 | Morais et al. | 713/189 |
| 2002/0120575 A1* | 8/2002 | Pearson et al. | 705/51 |
| 2003/0093574 A1* | 5/2003 | Fablet et al. | 709/310 |
| 2003/0154409 A1* | 8/2003 | Morota et al. | 713/201 |
| 2003/0189913 A1* | 10/2003 | Kim | 370/338 |
| 2003/0226014 A1* | 12/2003 | Schmidt et al. | 713/164 |
| 2004/0025019 A1* | 2/2004 | Watanabe et al. | 713/168 |
| 2004/0044906 A1* | 3/2004 | England et al. | 713/200 |
| 2004/0107237 A1* | 6/2004 | Kashiwada | 709/200 |
| 2004/0117622 A1* | 6/2004 | Marquet et al. | 713/165 |
| 2004/0133777 A1* | 7/2004 | Kiriansky et al. | 713/167 |
| 2004/0143748 A1* | 7/2004 | Yamaguchi et al. | 713/193 |
| 2004/0210760 A1* | 10/2004 | McGrath et al. | 713/190 |
| 2004/0210764 A1* | 10/2004 | McGrath et al. | 713/200 |
| 2004/0250063 A1* | 12/2004 | Gulick et al. | 713/160 |
| 2004/0250082 A1* | 12/2004 | Li et al. | 713/181 |
| 2005/0010804 A1* | 1/2005 | Bruening et al. | 713/200 |
| 2005/0022188 A1* | 1/2005 | Tameshige et al. | 718/100 |
| 2005/0055524 A1* | 3/2005 | Gulick et al. | 711/166 |
| 2005/0097326 A1* | 5/2005 | Kim et al. | 713/171 |
| 2005/0125537 A1* | 6/2005 | Martins et al. | 709/226 |
| 2005/0132186 A1* | 6/2005 | Khan et al. | 713/165 |
| 2005/0132226 A1* | 6/2005 | Wheeler et al. | 713/201 |
| 2005/0144457 A1* | 6/2005 | Lee et al. | 713/176 |
| 2005/0268103 A1* | 12/2005 | Camenisch | 713/176 |
| 2006/0236363 A1* | 10/2006 | Heard et al. | 726/1 |
| 2006/0277252 A1* | 12/2006 | Fablet et al. | 709/203 |
| 2007/0039046 A1* | 2/2007 | Van Dijk et al. | 726/22 |
| 2007/0050841 A1* | 3/2007 | Loen | 726/7 |
| 2008/0144382 A1* | 6/2008 | Asauchi et al. | 365/185.18 |
| 2008/0172559 A1* | 7/2008 | Yellepeddy | 713/158 |
| 2008/0212379 A1* | 9/2008 | Asauchi et al. | 365/189.07 |
| 2008/0276084 A1* | 11/2008 | Camenisch | 713/156 |
| 2008/0301448 A1* | 12/2008 | Charles et al. | 713/176 |

OTHER PUBLICATIONS

Chen et al., Certifying Program Execution with Secure Processors, May 2003, USENIX.*

"AEGIS: Architecture for tamper-evident and tamper-resistant processing" by G. E. Suh, D. Clarke, B. Gassend, M. van Kijk, and S. Devadas, proc. Of the 17th Int. Conference on Supercomputing, Jun. 2003.

* cited by examiner

MICROPROCESSOR, A NODE TERMINAL, A COMPUTER SYSTEM AND A PROGRAM EXECUTION PROVING METHOD

CROSS-REFERENCE TO RELATED APPLICATIONS

The present application is based on Japanese patent application serial No. 2005-013190, filed in Japan Patent Office on Jan. 20, 2005, the contents of which are hereby incorporated by reference.

BACKGROUND OF THE INVENTION

1. Field of the Invention

The present invention relates to a microprocessor capable of guaranteeing that the content of a memory is not unjustly falsified, a node terminal provided with such a microprocessor and capable of proving the execution of a program, a computer system and a program execution proving method.

2. Description of the Related Art

In recent years, with the development of networks, grid computing according to which a plurality of computers are connected and utilized as one computer, a mobile agent system for carrying out a processing by moving from one computer to another while suspending a program and an executed state of the program and other systems have been realized.

The grid computing is one method for solving a program having a large computational effort. A certain computer (job dispatch server or merely server) divides a problem and transfers programs and data for solving sections of the problem to a multitude of computers (nodes) network-connected with the server. Each node executes the received program and returns an execution result to the server. Projects such as seti@home, United Devices, Distribute.net, particularly those by volunteer participants are known as projects using such grip computing. Since rewards are given according to the computational effort in these projects, it is essential to guarantee or prove that the nodes precisely executed the given programs.

In the mobile agent system, a program transmitted from a certain computer (agent) is executed while being moved from one to another of network-connected computers (hosts). In order to obtain a correct execution result, it is necessary to guarantee that the program was properly executed in the hosts by way of which the program had been moved. For security in the mobile agent, it is necessary to prevent two attacks, i.e. a malicious attack from the agent to the host and a malicious attach from the host to the agent.

Besides the above grid computing and mobile agent system, the e-commerce, the DRM (digital right management) for software and digital contents and the like have been recently in widespread use, wherefore computer security having even higher reliability is being required. At present, the security of most computers secures reliability only by software, but there is a limit in securing reliability by entering a security code or carrying out an obfuscation processing for each application configured by a different programmer. Further, the software is weak against an attack from malicious software being simultaneously executed in the same computer such as an operating system (OS) or an other process. Accordingly, a scheme called trusted computing for supporting the computer security not by software, but by both hardware and software is being studied.

An architecture called "AEGIS" is, for example, disclosed in the following document as a method for guaranteeing that a program is not falsified in order to prove that a remote computer precisely executed this program in such trusted computing:

"AEGIS: Architecture for tamper-evident and tamper-resistant processing" by G. E. Suh, D. Clarke, B. Gassend, M. van Kijk, and S. Devadas, proc. Of the $17^{th}$ Int. Conference on Supercomputing, June 2003."

This AEGIS is configured to guarantee no falsification of the content of a memory by using a special hash function in order to deal with a malicious attack.

However, a technology according to the above document only mathematically argues the reality of guaranteeing that the content of the memory is not falsified using the special hash function, and does not disclose a specific configuration. The implementation of such a special hash function in hardware is thought to extend a critical path and lead to a temporarily and spatially large overhead.

SUMMARY OF THE INVENTION

In view of the problems residing in the prior art, an object of the present invention is to provide a microprocessor capable of guaranteeing that the content of a memory is not unjustly falsified during the execution of a program, a node terminal provided with such a microprocessor and capable of proving the execution of the program, a computer system and a program execution proving method.

In order to resolve the above described disadvantage and attain the object, one aspect of the present invention is directed to a microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside. The apparatus comprises: first storage means for saving a program transmitted from the server terminal, processing means for executing the program saved in the first storage means, first unidirectional function operating means for operating the program executed by the processing means using a specified first unidirectional function when the execution of the program is completed, secret key storage means for saving a secret key peculiar to the node terminal and used in a public key cryptosystem, signature executing means for digitally signing the program operated using the first unidirectional function and an execution result of the program obtained from the processing means, using the secret key saved in the secret key storage means, and transmitting means for transmitting the program and the execution result of the program digitally signed by the digital signature executing means as the result information.

Another aspect of the present invention is directed to a microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside. The apparatus comprises: first storage means for saving a program transmitted from the server terminal, processing means for executing the program saved in the first storage means, first unidirectional function operating means for operating the program executed by the processing means and an execution result of the program using a specified first unidirectional function when the execution of the program is completed, secret key storage means for saving a secret key peculiar to the node terminal and used in a public key cryptosystem, signature executing means for digitally signing the program and an execution result of the program operated using the first unidirectional function, using the secret key saved in the secret key storage means, and transmitting means for transmitting an execution result of the program obtained from the processing means, and the program and the execution result of the program digitally signed by the digital signature executing means as the result information.

These and other objects, features, aspects and advantages of the present invention will become more apparent upon a reading of the following detailed description and accompanying drawings.

DESCRIPTION OF THE PREFERRED EMBODIMENTS

Figure 1:
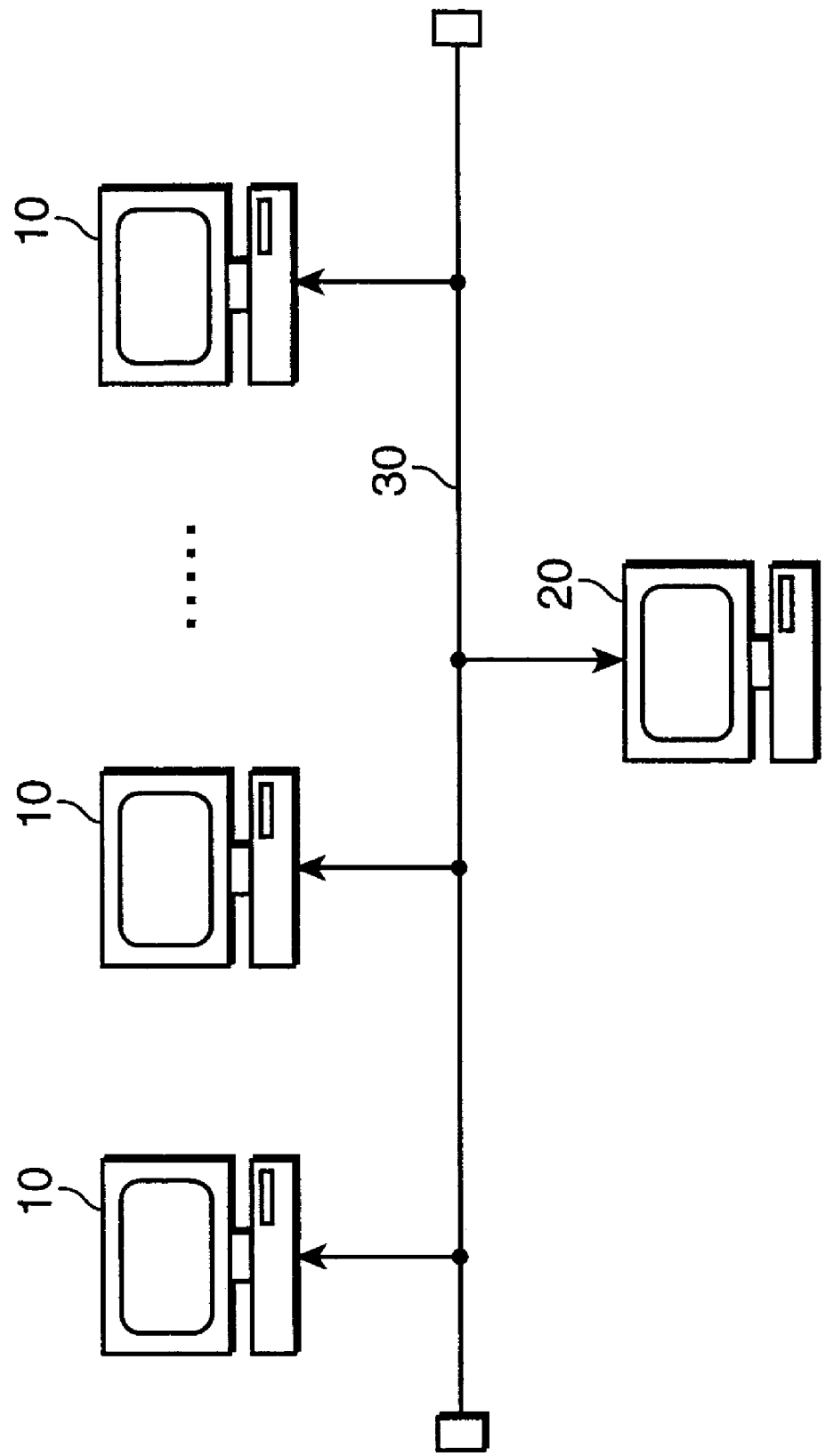
FIG. 1 is a schematic construction diagram of a computer system according to one embodiment of the invention.

Hereinafter, one embodiment of a computer system according to the present invention is described with reference to the accompanying drawings. It should be noted that constructions or processings identified by the same reference numerals in the respective drawings are identical constructions or processings and no detailed description is repeated.

FIG. 1 is a schematic construction diagram of the computer system according to one embodiment of the present invention. This computer system is comprised of n (n is an integer) computers (nodes) 10 and a computer (server) 20. The nodes 10 and the server 20 are so connected by a communication cable 30 such as 10 Base-T or 100 BASE-TX as to be bilaterally communicable. Each of the nodes 10 and the server 20 includes a CPU (central processing unit), a RAM (random access memory) used as a working area of a CPU and adapted to temporarily save various data, a ROM (read only memory) for storing control programs such as a BIOS (basic input output system), a hard disk drive (HDD), and the like.

Each of the nodes 10 and the server 20 further includes an external storage device for storing an operating system (OS), a storage medium driving device for reading data from a storage medium such as a CD-ROM or a DVD-ROM, a communication interface (I/F) constructed by a communication board or the like for controlling the transmission and reception of data, an input device constructed by a keyboard, a mouse or the like, and a display device constructed by a CRT (cathode ray tube), a liquid crystal panel, a plasma display or the like.

In grid computing, the server 20 has a function of dividing a problem and transferring programs and data used to solve the divided sections of the problem to a multitude of nodes 10 network-connected with the server 20. In a mobile agent system, the server 20 corresponds to an agent for transmitting programs and the nodes 10 correspond to hosts for receiving the programs from the server 20 and executing the programs. It should be noted that the above computer system is merely one example and that the nodes 10 and the server 20 may be connected using an other cable, a USB cable or a wire transmission.

(Procedure of Proving the Program Execution)

Figure 2:
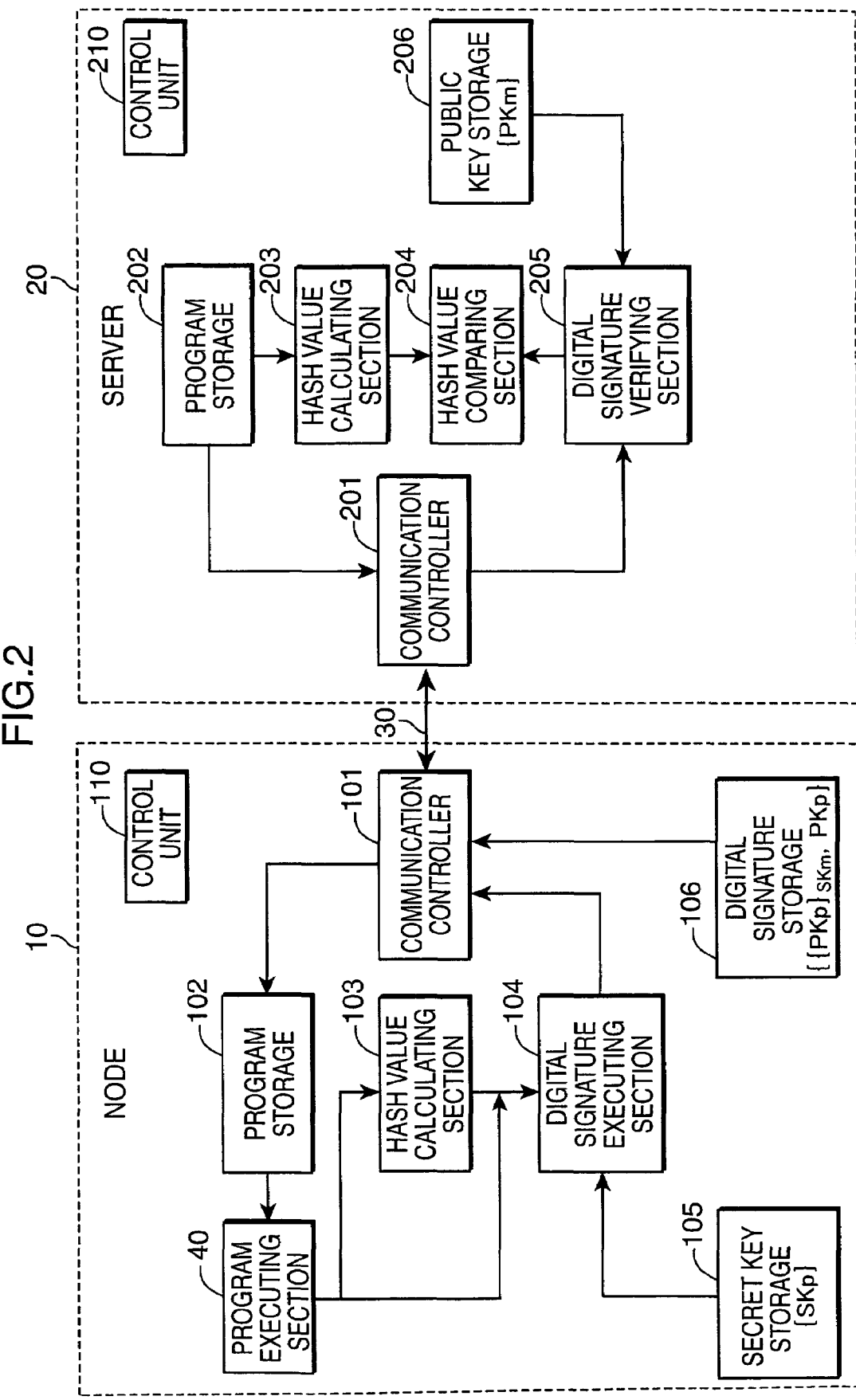
FIG. 2 is a function block diagram of the computer system.

Next, a procedure of proving the program execution according to the present invention is described with reference to figures. FIG. 2 is a function block diagram of the computer system according to the one embodiment of the present invention. In this embodiment is described one example of grid computing according to which the nodes 10 execute the programs transmitted from the server 20 and transmit result information including the executed programs and the execution results of the programs back to the server 20. Although a "public key cryptosystem" using different keys for encrypting and decrypting is described in this embodiment, a "common key cryptosystem" may be used provided that keys can be delivered to others without being kept secret to others. For example, a RSA and an elliptic curve cryptosystem are known as the public key cryptosystem.

Further, a CPU according to the one embodiment of the present invention is tamper-resistant. Tamper resistance is a property of making it impossible to directly access from the outside and making it extremely difficult to unreasonably observe or falsify secret information and its processing mechanism. For example, the tamper resistance detects an abnormality in clock frequency in order to deal with an attack of increasing a clock frequency until a circuit undergoes a malfunction; removes a checking LSI pad at the time of shipment; and suppresses variations of power consumption and processing time in order to prevent the leak of internal information due to such variations. The tamper resistance is already utilized in IC cards, PKIs (public key infrastructures) and the like. In the CPU used in the following embodiment as well, the tamper resistance is utilized to protect secret keys used in digital signatures and to prevent attacks such as observation and falsification of the processing of proving the program execution.

Each node 10 is provided with a communication controller (transmitting means) 101, a program storage 102, a hash value calculating section (first unidirectional function calculating means) 103, a digital signature executing section (signature executing means) 104, a secret key storage (secure key storage means) 105, a digital signature storage 106, a program executing section 40, and a control unit 110. The communication controller 101 is constructed, for example, by a communication interface (I/F) and is a function section of the node 10 for transmitting and receiving data and the like to and from the server 20. For example, the communication controller 101 receives the program from the server 20 and transmits data obtained by digitally signing an execution result of the program and the like, and the digital signature saved in the digital signature storage 106 to the server 20.

The program storage 102 is constructed, for example, by a storage device such as a ROM or a RAM for saving the program transmitted from the server 20. The hash value calculating section 103 is constructed, for example, by a CPU, a RAM or the like for calculating a hash value of the program executed in the program executing section 40 using a specified hash function (H). Here, the hash function is a function for returning a string (hereinafter, hash value h) of a fixed length upon receiving an input m of an indefinite length. In other words, the hash value h can be given by $h=H(m)$. This hash function is a unidirectional function and, if input values differ even only by 1 bit, output values largely differ. Thus, the hash function has such a characteristic that it is computationally almost impossible to find an input x, which satisfies $h=H(x)$, even if the hash value h is given. For example, MD5, SHA-1 or HMAC is known as the hash function.

The program executing section 40 is constructed, for example, by a CPU or a RAM for executing the program transmitted from the server 20. It is assumed that the entire program executing section 40 is tamper-resistant or the program executing section 40 has a function section for monitoring whether or not the program transmitted from the sever 20 has been precisely executed if it is not tamper-resistance as a whole.

The secret key storage 105 is constructed, for example, by a storage device such as a ROM for saving a secret key (SKp) in the public key cryptosystem. The digital signature executing section 104 is constructed, for example, by a CPU or a RAM for digitally signing the program executed in the program executing section 40 and the execution result received from the program executing section 40 (hereinafter, a digitally signed result is expressed by $\{H(program), Out\}_{SKp}$) using the secret key saved in the secret key storage 105 in accordance with the public key cryptosystem. The digital signature storage 106 is constructed, for example, by a storage device such as a ROM for saving a public key (PKp) corresponding to the secret key SKp and a result $\{PKp\}_{SKm}$ obtained by digitally signing the public key PKp using the secret key (SKm) peculiar to a CPU manufacturer. The control unit 110 controls the above various function sections in the node 10 to carry out desired processings.

The server 20 is provided with a communication controller 201, a program storage 202, a hash value calculating section 203, a hash value comparing section 204, a digital signature verifying section 205, a public key storage 206, and a control unit 210. The communication controller 201 is constructed, for example, by a communication interface (I/F) and is a function section of the server 20 for transmitting and receiving data and the like to and from the nodes 10. For example, the communication controller 201 transmits the programs to the nodes 10, and receives the data obtained by digitally signing the execution result of the program and the digital signature saved in the digital signature storage 106 from each node 10.

The program storage 202 is constructed, for example, by a storage device such as a ROM or a RAM for saving the programs to be executed by the nodes 10. These programs may be an undivided program left as it is or programs divided by a specified function section in order to let the nodes 10 to solve the divided sections of the problem.

The hash value calculating section 203 is constructed, for example, by a CPU, a RAM or the like for calculating a hash value of the program stored in the program storage 202 using the same hash function as the one used in the hash value calculating section 103 of the node 10.

The public key storage 206 is constructed, for example, by a storage device such as a ROM for saving the public key (PKm) corresponding to the secret key SKm peculiar to the CPU manufacturer. This public key PKm is assumed to be received from the node 10 beforehand using a reliable communication path or the like. The digital signature verifying section 205 is constructed, for example, by a CPU or a RAM for verifying whether or not the digital signature of a specific node 10 is certainly made to the execution result and the like sent from this node 10. The hash value comparing section 204 compares the hash value of the program calculated in the hash value calculating section 203 with the hash value of the program executed in the program executing section 40 after being transmitted from the server 20.

The control unit 210 controls the above various function sections of the server 20 to carry out desired processings. In FIG. 2, a line for transmitting and receiving control signals and the like between the control units 110 and 210 is not shown in order to keep FIG. 2 simpler.

Figure 3:
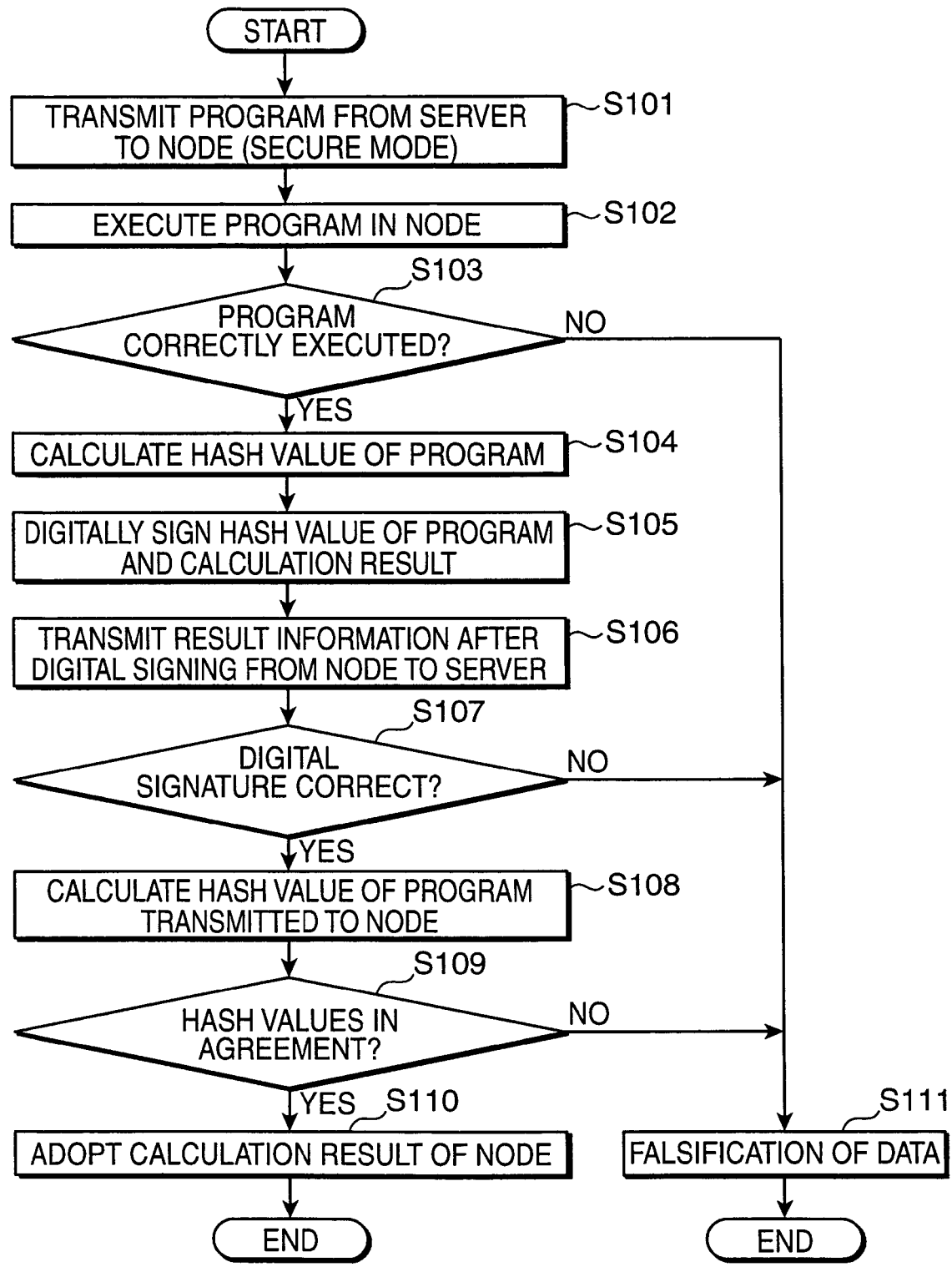
FIG. 3 is a flow chart showing the operation of the computer system.

FIG. 3 is a flow chart showing the operation of the computer system according to the one embodiment of the present invention. First, the control unit 210 transmits the program stored in the program storage 202 to the node 10 via the communication controller 201 (Step S101). The node 10 having received the program transmitted from the server 20 via the communication controller 101 saves this program in the program storage 102. Subsequently, the control unit 110 sends this program from the program storage 102 to the program executing section 40, where this program is executed (Step S102).

Subsequently, when the execution of the program in the program executing section 40 is completed, the control unit 110 judges whether or not the program transmitted from the server 20 has been correctly executed in the program executing section 40 (Step S103). As a result, if the program transmitted from the server 20 is judged not to have been correctly executed in the program executing section 40 (NO in Step S103), the control unit 110 judges that the data were falsified by an attacker (Step S11) and ends the processing.

On the other hand, if the program transmitted from the server 20 is judged to have been correctly executed in the program executing section 40 (YES in Step S103), the control unit 110 sends the program executed in the program executing section 40 to the hash value calculating section 103, where the hash value of this program is calculated (Step S104). Subsequently, the control unit 110 controls the digital signature executing section 104 to let it digitally sign the hash value of the program calculated in the hash value calculating section 103 and the execution result of the program executed in the program executing section 40 (Step S105). At this time, the digital signature executing section 104 digitally signs using the secret key SKp saved in the secret key storage 105.

Subsequently, the control unit 110 transmits, in addition to the hash value of the program and the execution result digitally signed in the digital signature executing section 104, the public key PKp corresponding to the secret key SKp and the result $\{PKp\}_{SKm}$ obtained by digitally signing this public key PKp using the secret key SKm peculiar to the CPU manufacturer to the server 20 via the communication controller 101 (Step S106).

Upon receiving the above data via the communication controller 201, the control unit 210 sends this data to the digital signature verifying section 205, where the digital signature is verified (Step S107). At this time, the digital signature verifying section 205 verifies the digital signature using the public key PKm saved in the public key storage 206. Specifically, the digital signature verifying section 205 first verifies the result $\{PKp\}_{SKm}$ using the public key PKm, and then the digitally signed result $\{H(program), Out\}_{SKp}$ using the verified PKp. If the verified digital signature is judged not to be the digital signature of the node 10 instructed to execute this program as a result of either one of these verifications, the control unit 210 judges that the data were falsified by an attacker (Step S111) and ends the processing.

On the other hand, if the verified digital signature is judged to be the digital signature of the node 10 instructed to execute this program, the control unit 210 sends the program stored in the program storage 202 to the hash value calculating section 203, where the hash value is calculated (Step S108). Then, the hash value calculated in the hash value calculating section 203 and the hash value H(program) of the program transmitted from the node 10 and verified in the digital signature verifying section 205 are compared (Step S109). If the hash value comparing section 204 judges that the two hash values are at variance (NO in Step S109), the control unit 210 judges that the data were falsified by an attacker (Step S111) and ends the processing.

If the hash value comparing section 204 judges that the two hash values are in agreement (YES in Step S109), the control unit 210 judges that the program transmitted to the node 10 was correctly executed and the data were not falsified by an attacker different from the above cases. Thus, the execution result (Out) received from the node 10 is adopted (Step S110) and the processing is normally ended.

In the above procedure of proving the program execution, the hash value of the program calculated in the hash value calculating section 103 and the execution result from the program executing section 40 are digitally signed together. However, the present invention is not limited thereto. The digital signature executing section 104 may digitally sign the hash value of the program executed in the program executing section 40 and the execution result from the program executing section 40 after the hash value is calculated in the hash value calculating section 103.

In this case, the execution result of the program obtained from the program executing section 40 may be transmitted to the server 20 as it is via the communication controller 101 and, separately therefrom, the digitally signed program and execution result of the program may be transmitted to the server 20. Then, the program stored in the program storage 202 and the execution result of the program received from the node 10 are sent to the hash value calculating section 203, where the hash value is calculated. Separately, the digitally signed execution result of the program received from the node 10 is verified in the digital signature verifying section 205. If the execution result is verified to be the result information certainly transmitted from the node 10, it is sent to the hash value comparing section 204. The hash value sent from the digital signature verifying section 205 and the one sent from the hash value calculating section 203 are compared in the hash value comparing section 204, and it is proved that the program was correctly executed in the node 10 if these hash values are in agreement.

The hash value calculating section 103 may be so constructed as to calculate the hash value for a collection of the program and the execution result of this program or may be so constructed as to separately calculate the hash values for the program and the execution result of the program.

Further in the above procedure of proving the program execution, verification is made at two stages in the server 20 by providing the digital signature storage 106 and saving the public key PKp corresponding to the secret key SKp and the result $\{PKp\}_{SKm}$ obtained by digitally signing this public key PKp using the secret key SKm peculiar to the CPU manufacturer in the digital signature storage 106. However, the present invention is not limited thereto. PKp may be saved instead of PKm in the public key storage 206 of the server 20 without providing the digital signature storage 106 and the data signed using SKp in the digital signature executing section 104 may be directly verified in the digital signature verifying section 205.

Hereinafter, the program execution proof is described while describing a specific construction for each of the case where the memory and the program executing section 40 are constructed by one tamper-resistant chip and the case where the tamper-resistant CPU constructing the program executing section 40 is constructed by a chip different from the memory.

First Embodiment

First, the first embodiment is described with respect to the case where the CPU constructing the program executing section 40 and the memory are constructed by one tamper-resistant chip. In this case, since it is impossible for an attacker to monitor a memory bus line, no external attack can be made to the memory. Therefore, the content of the memory can be relied upon. The processing of a microprocessor provided with a CPU and a memory for proving the execution of a program is described for this case. This embodiment supposes a single-task operating system.

Figure 4:
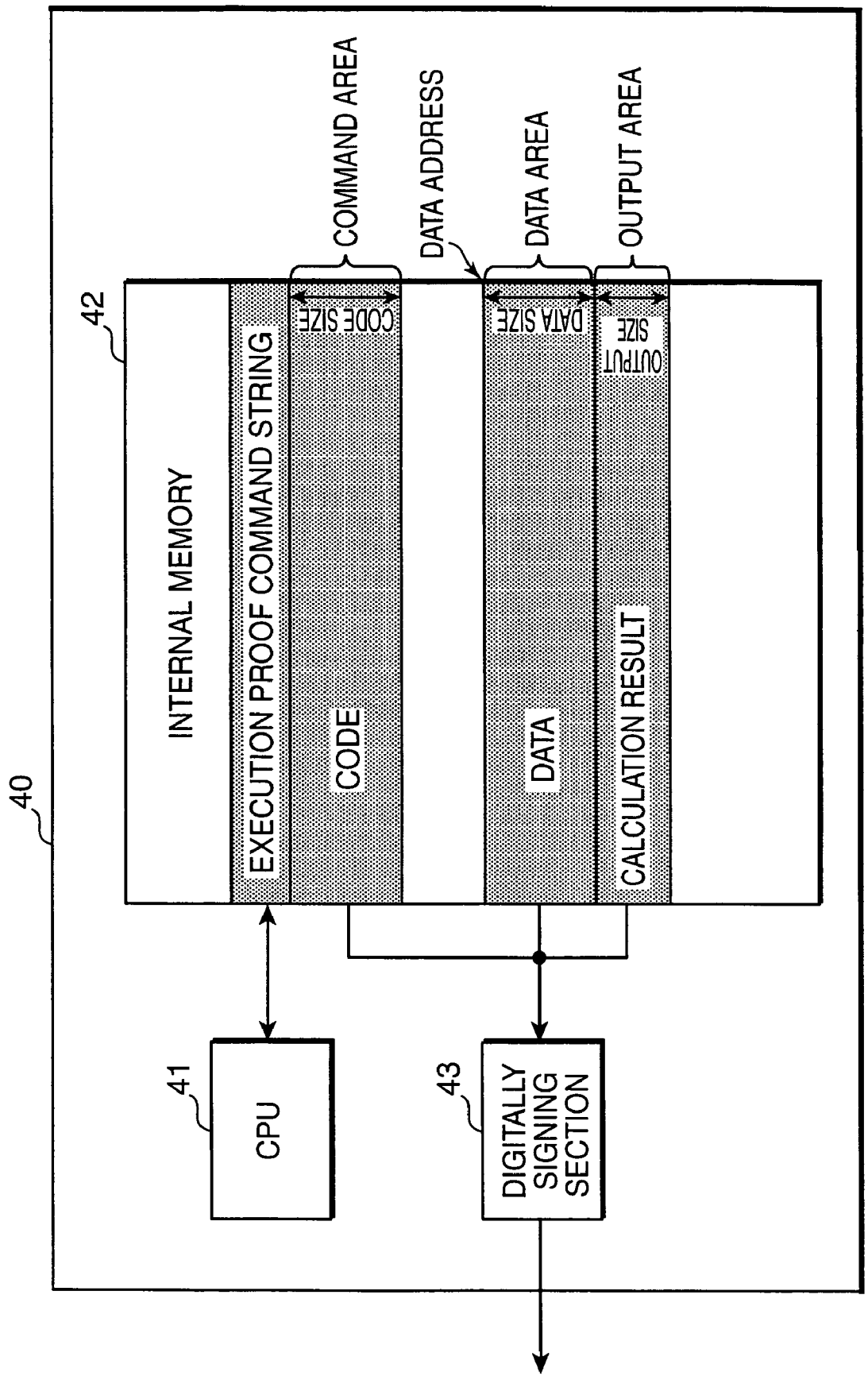
FIG. 4 is a function block diagram showing a program executing section according to a first embodiment in detail.

FIG. 4 is a function block diagram showing the program executing section 40 according to the first embodiment in detail. The program executing section 40 is a microprocessor including a CPU (processing means) 41, an internal memory (first storage means, third storage means) 42 and a digitally signing section 43, the parts 41, 42, 43 being mounted on the same chip, and is tamper-resistant. An execution proof command string transmitted from the server 20 is developed in the internal memory 42 by the operating system, and a program required to be executed is developed in a command area and a data area of the internal memory 42 by the operating system. An execution result of this program is written in an output area. The digitally signing section 43 is, for example, a function section including the hash value calculating section 103, the digital signature executing section 104 and the secret key storage 105 shown in FIG. 2.

Figure 5:
FIG. 5 is a diagram showing one embodiment of an execution proof command string shown in FIG. 4.
Figure 6:
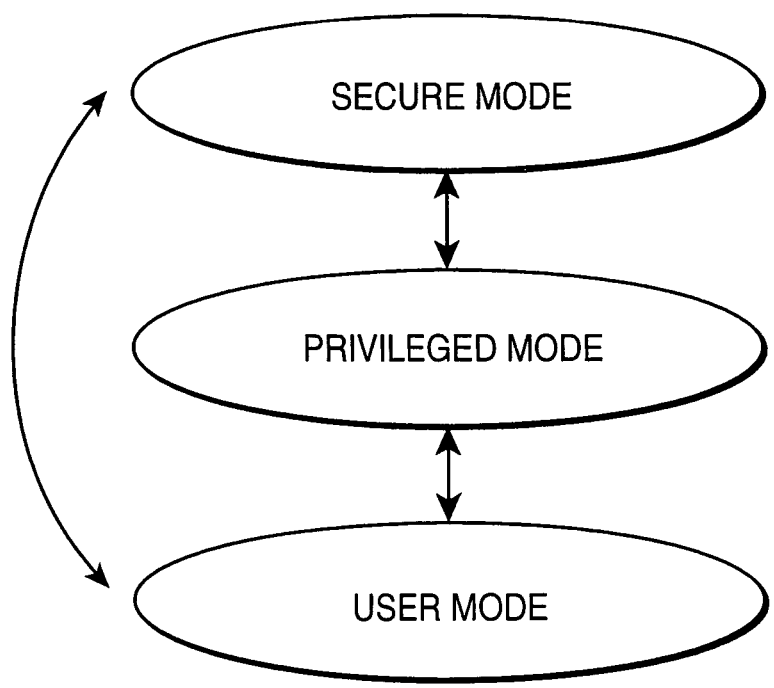
FIG. 6 is a diagram showing one embodiment of a mode of a CPU.

FIG. 5 is a diagram showing one mode of the execution proof command string shown in FIG. 4, and FIG. 6 is a diagram showing one mode possessed by the CPU. A user mode and a privileged mode are prepared in many CPUs. In embodiments of the present invention, a "secure mode" for monitoring whether or not the program is being normally executed is additionally prepared.

As shown in FIG. 5, the CPU 41 has a special command [certify] for requesting the proof of the program execution and causing the CPU 41 to enter the secure mode. This special command [certify] designates addresses and a range of the memory where the program whose execution is desired to be proved using an operand is developed. The command area extends by as much as a code size from an address of the execution proof command string, and the data area extends by as much as a data size from a data address. The execution result is written in the output area, which is an area extending by as much as an output size from an end address of the data area.

Upon executing the [certify] command included in the execution proof command string of FIG. 4, the CPU 41 is switched to the secure mode (Step S101 of FIG. 3). The program executing section 40 shown in FIG. 4 carries out the processing in Step S102 shown in FIG. 3, i.e. carries out the processing developed in the command area of the internal memory 42 while monitoring a program counter and an address bus. At this time, since the CPU 41, the internal memory 42 and the digitally signing section 43 constructing the program executing section 40 are all mounted on the same chip and tamper-resistant, there is no possibility of, for example, falsifying the content of the internal memory 42 by an external attack during the program execution. Therefore, it is guaranteed that a correct program is being executed in Step S103.

Subsequently, upon the completion of the execution of the command area required to be proven, the program in the command area and the data area is sent to the hash value calculating section 103 in the digitally signing section 43, where the hash value is calculated (Step S104). Subsequently, the digital signature is generated in the digital signature executing section 104 in the digitally signing section 43 while including the execution result (Step S105), thereby ending the secure mode.

Although the single-task operating system is supposed in this embodiment, the operating system saves a value of a resistor as process information upon switching the process in the case of executing the program on a multi-task operating system. Thus, a malicious operating system or other processes rewritten by a virus or the like can observe and/or falsify the process during the program execution proof processing.

In order to deal with an attack from this malicious operating system, it can be thought to let the CPU, for example, monitor the address bus to protect a memory space. It can be also thought to let not the operating system, but the CPU switch the process and to save the information by encrypting the process information in such a manner as to be decryptable only by the CPU upon switching the process. Further, in order to guarantee no falsification of the content (context) of the register before and after the switch of the process, it is also possible to copy the context during a timer interrupt, to save the copied context in the CPU and to verify whether or not the context is falsified when the context is returned.

In the case of utilizing a dynamic link library (DLL) in a program whose execution is desired to be proven, the DLL is linked with a shared object file prepared on the computer beforehand. Thus, if the shared object file is malicious, there is a possibility of an unfair processing. In order to prevent this, a hash value may be calculated while including shared objects, and a hash value may be similarly calculated in the server 20 while saving the same shared objects. However, this leads to a higher cost since it is necessary, for example, to administer the versions of various shared objects. In order to hold the cost down, it is possible to distribute not by means of the dynamic link library, but by means of a static link. This increases the program size, but the verification can be more easily carried out.

As described above, according to this embodiment, an operation result of the program and a hash function (unidirectional function) may be transmitted to the server 20 instead of the program itself executed in the program executing section 40. Since a small difference between the input values is outputted as a large difference according to the hash function, if the program before being transmitted is similarly calculated using the same hash function in the sever 20, verification as to whether or not the program executed in the node 10 is certainly the one sent from the server 20 can be easily carried out. Further, since the public key cryptosystem is adopted and digital signature is made using the secret key peculiar to the node 10, the public key can be safely delivered to the server 20 and the certain execution of the program in the designated node 10 can be proven.

Second Embodiment

Although the CPU and the memory are mounted on the same chip in the foregoing embodiment, the CPU and the memory are constructed by different chips in many of present computers such as those for participating in actual grip computing. In such a case, it can be supposed that the memory bus is monitored and software attacks and hardware attacks different from the software attacks are made. The hardware attack is, for example, such that not a memory, but a memory emulator is connected with a memory bus and an arbitrary address of the memory is observed at an arbitrary timing independently from a CPU to falsify the content to an arbitrary value. Accordingly, examples of the program execution proof in the case that the CPU and the memory are constructed by different chips, i.e. the memory (external memory) is possibly attacked and data saved therein cannot be relied are described in the second and third to six embodiments to be described later.

Figure 7:
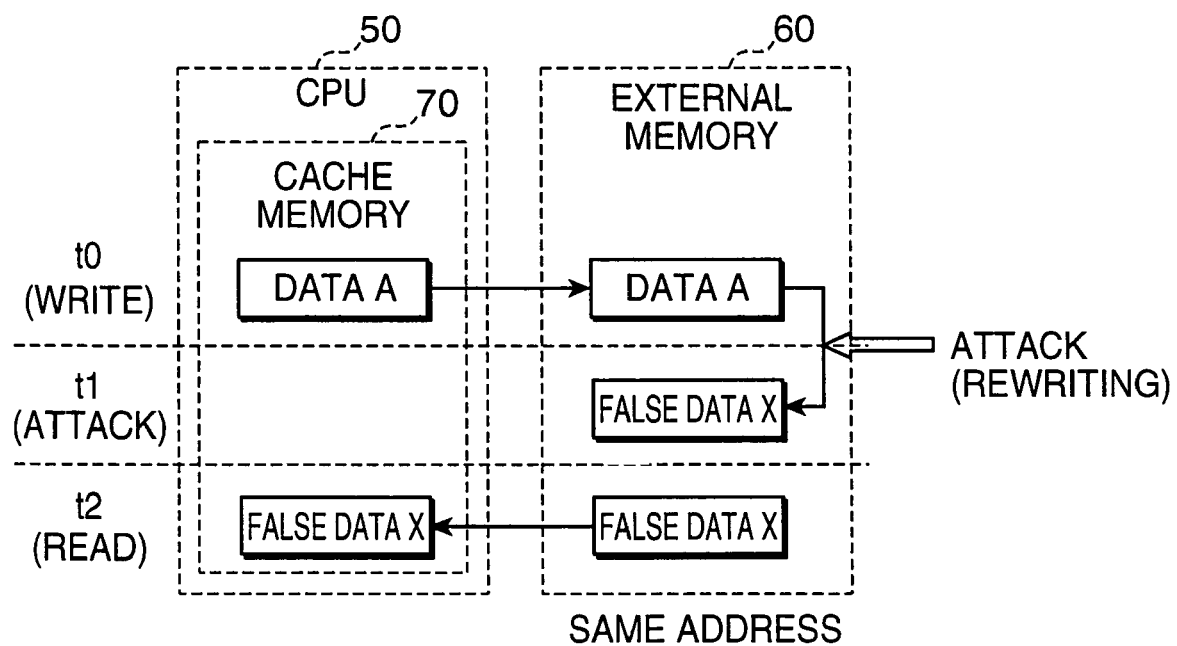
FIG. 7 is a diagram showing an attack called a spoofing attack.

FIG. 7 is a diagram showing an attack called a spoofing attack. At certain time t0, a CPU (microprocessor) 50 writes a correct data A saved in a cache memory (first storage means) 70 in an external memory (second storage means) 60. At certain time t1, an attacker rewrites the data A saved in the external memory 60 with a false data X at the same address. Thereafter, when the CPU 50 reads the data at this address from the external memory 60, the read data is not the correct data A, but the false data X after the falsification. Thus, the CPU 50 carries out a wrong processing thereafter, and the execution result of the executed program become false. This is an attacked called a spoofing attack.

Figure 8:
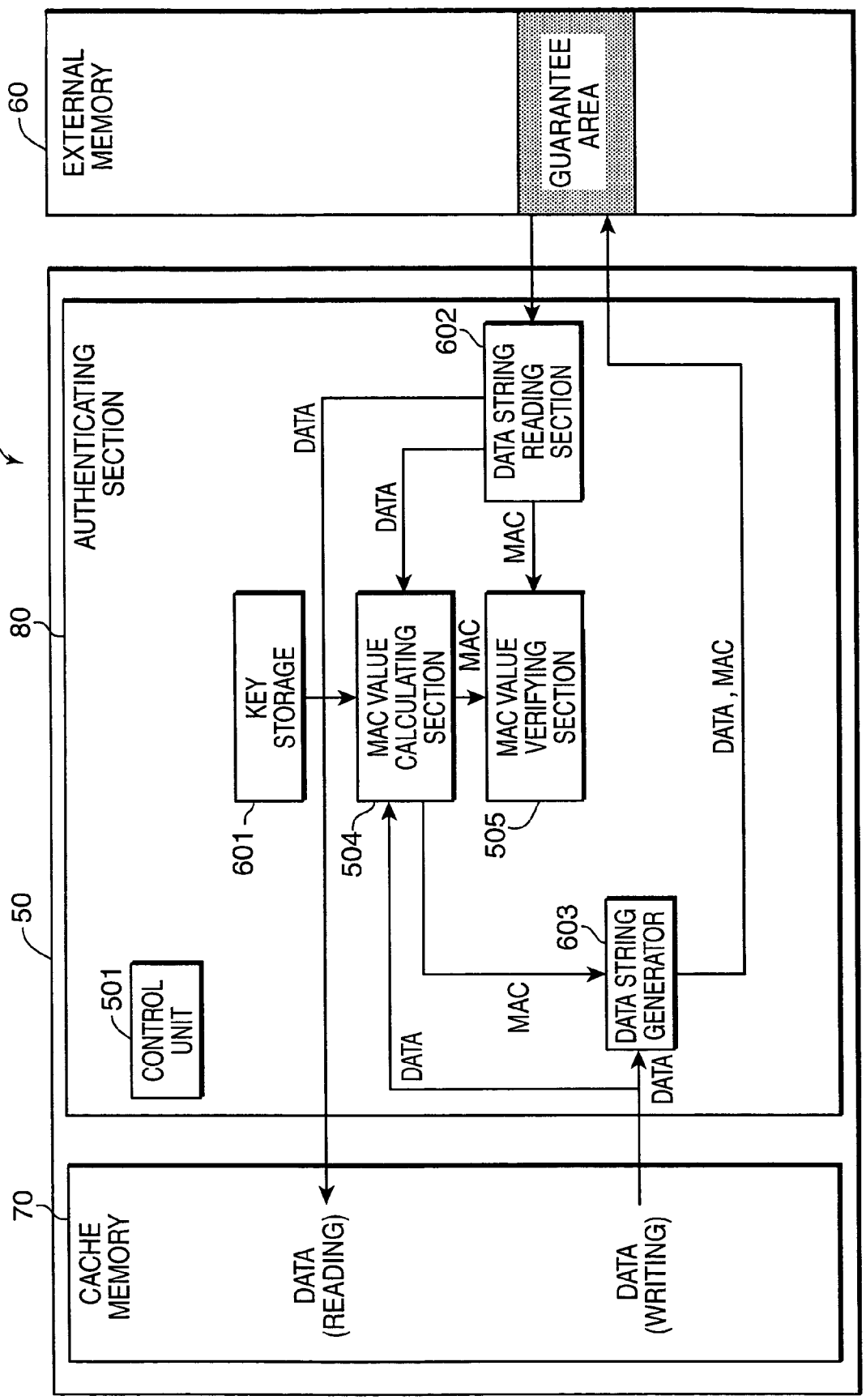
FIG. 8 is a function block diagram showing a program executing section according to a second embodiment in detail.

FIG. 8 is a function block diagram showing a program executing section 40 for preventing the spoofing attack in detail. The program executing section 40 is provided with the CPU 50 and the external memory 60 formed on a chip different from the one for the CPU 50. The CPU 50 includes the cache memory 70, an authenticating section 80 as a function section for monitoring whether or not the program is being normally executed, and an unillustrated digitally signing section 43. This CPU 50 is assumed to be tamper-resistant. Further, specified addresses of the external memory 60 serve as an area for guaranteeing no falsification of data (hereinafter, "guarantee area").

A MAC value calculating section (function value calculating means) 504 calculates hash values (MAC values) of data read from the cache memory 70 and the external memory 60 using a hash function (second unidirectional function) called a message authentication code (MAC). A key necessary for the use of this MAC is saved in a key storage (one mode of key generating means) 601.

A data string generator (data string generating means and writing means) 603 compiles the data read from the cache memory 70 and the MAC value calculated by the MAC value calculating section 504 into one data string, encrypts it using the common key cryptosystem, and then writes it at a specified address within the guarantee area of the external memory 60. A data string reading section (reading means and decrypting means) 602 reads the data string from the specified address of the external memory 60, decrypts it using the common key cryptosystem, and then sends the data contained in this data string to the MAC value calculating section 504 while sending the MAC value contained in this data string to a MAC value verifying section 505. Further, a key necessary for the encryption and decryption by the common key cryptosystem is saved in an unillustrated storage means.

The MAC value verifying section (verifying means) 505 compares the MAC value calculated from the data read by the data string reading section 602 in the MAC value calculating section 504 and the MAC value contained in the data string read by the data string reading section 602, and judges that the data string was not falsified in the external memory 60 when these MAC values are in agreement. In other words, in this judgment, the data and the MAC value of this data are in a one-on-one correspondence and the fact that, if the MAC value differs, the data based on the MAC value also differs is used.

When the data string reading section 602 sends the data contained in the data string read from the external memory 60 to the cache memory 70 if the data read from the external memory 60 is judged not to have been falsified in the MAC value verifying section 505. A controller 501 controls the respective function sections provided in the authenticating section 80 to carry out a specified processing. Further, control lines connecting the controller 501 and the respective function sections provided in the authenticating section 80 are not shown in order to simplify FIG. 8.

Figure 9:
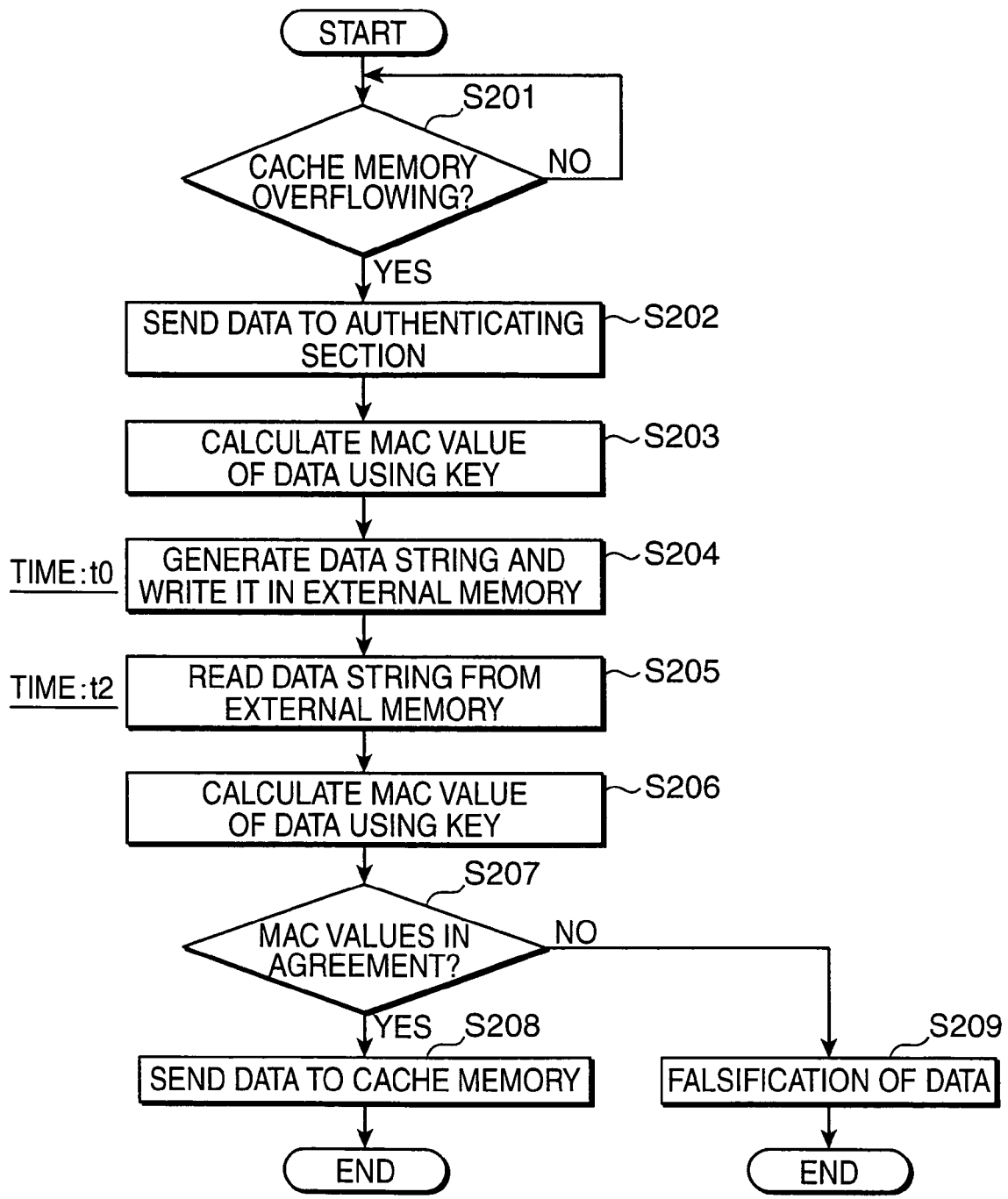
FIG. 9 is a flow chart showing the procedure of operations carried out by the program executing section in order to prevent a spoofing attack.

FIG. 9 is a flow chart showing the procedure of operations carried out by the program executing section 40 in order to prevent a spoofing attack. This flow chart and those used to describe the succeeding embodiments show the operations in Steps S102 and S103 of FIG. 3 in detail.

First, when a program is being executed in the CPU 50 of the node 10, the overflow of the cache memory 70 is checked (Step S201). In the case of the overflow of the cache memory 70 due to an excessively large data, the data is sent from the cache memory 70 to the authenticating section 80 (Step S202). The MAC value calculating section 504 receives the data sent from the cache memory 70 and calculates the MAC value of this data using the key saved in the key storage 601 (Step S203). The MAC value calculated in the MAC value calculating section 504 is sent to the data string generator 603.

After compiling the data received from the cache memory 70 and the MAC value received from the MAC value calculating section 504 into one data string and encrypting this data string, the data string generator 603 writes the encrypted data string at a specified address in the guarantee area of the external memory 60 (Step S204). This corresponds to the writing operation at time to of FIG. 7.

Thereafter, at certain time t2, the data string reading section 602 reads the data string written at time t0 from the external memory 60 (Step S205). The data string reading section 602 sends the data contained in this data string to the MAC value calculating section 504 and the MAC value contained in this data string to the MAC value verifying section 505. The MAC value calculating section 504 calculates the MAC value of the data received from the data string reading section 602 using the key saved in the key storage 601 (Step S206).

The MAC value verifying section 505 compares the MAC value received from the data string reading section 602 and the one received from the MAC value calculating section 504 (Step S207). As a result of this comparison, the MAC value verifying section 505 judges no falsification of the data in the external memory 60 and notifies it to the controller 501 if the MAC values are in agreement (YES in Step S207). The controller 501 causes the data string reading section 602 to send the data to the cache memory 70 based on the notification from the MAC value verifying section 505 (Step S208). On the other hand, if the MAC values are at variance (NO in Step S207), the MAC value verifying section 505 judges the falsification of the data string in the external memory 60 (Step S209). In this case, for example, the execution of the program may be ended and a corresponding notification may be made from the node 10 to the server 20.

As described above, according to this embodiment, the external memory 60 provided outside the CPU 50 is not protected by the tamper resistance. However, not only the data, but also the MAC value, which is an operation result of the data using the unidirectional function (hash function), are saved in the external memory 60. Therefore, by comparing the MAC values, verification as to whether or not the data were falsified can be effectively and securely carried out.

Third Embodiment

Figure 10:
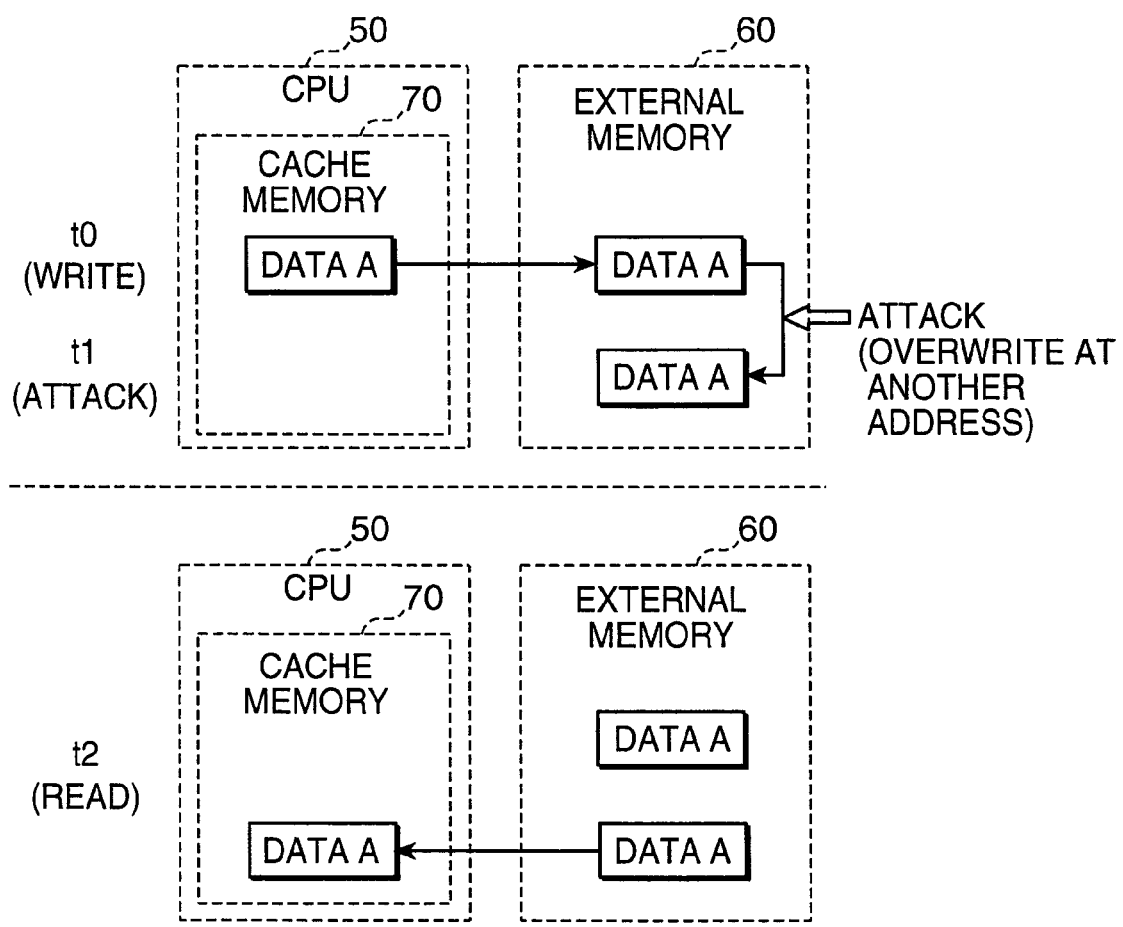
FIG. 10 is a diagram showing an attack called a splicing attack.

FIG. 10 is a diagram showing an attack called a splicing attack. At certain time t0, the CPU 50 writes a correct data A saved in the cache memory 70 in the external memory 60. At certain time t1, an attacker overwrites a content at a different address with the data A saved in the external memory 60. If the CPU 50 reads the data the attacker wrote in the external memory 60 at time t2 thereafter, even if the MAC value of the data should be added to the read data, the CPU 50 cannot detect the falsification of the data since the MAC value is correct. Therefore, the CPU 50 carries out a wrong processing thereafter, and the execution result of the executed program becomes false. This is an attack called a splicing attack.

Figure 11:
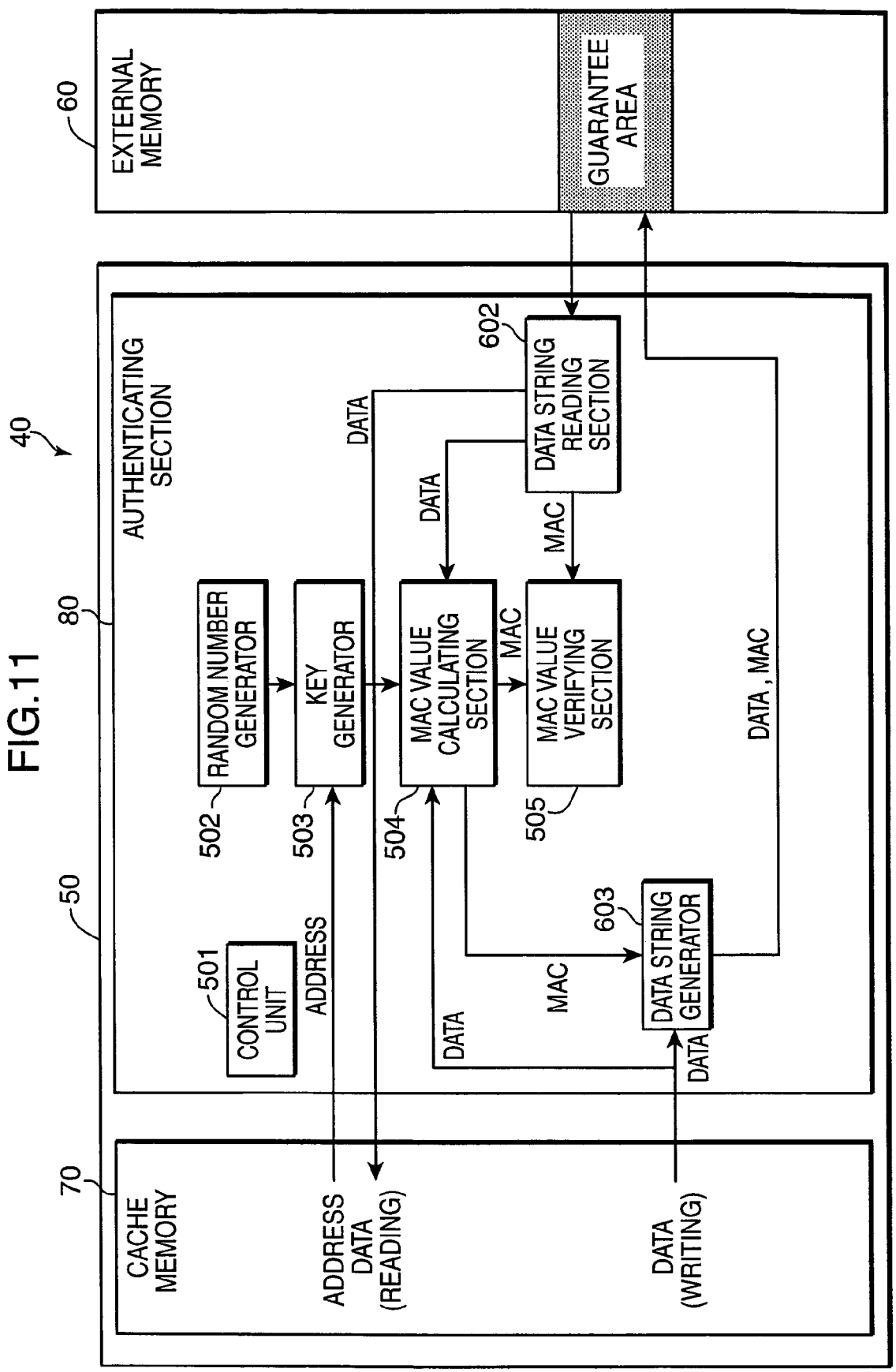
FIG. 11 is a function block diagram showing a program executing section according to a third embodiment in detail.

FIG. 11 is a function block diagram showing a program executing section 40 for preventing a splicing attack in detail. In FIG. 11, a random number generator (random number generating means) 502 and a key generator (one mode of key generating means) 503 are additionally provided in the block diagram of FIG. 8 for the second embodiment. The key generator 503 receives an address of the external memory 60 where the data is to be written from the cache memory 70, and generates the key used for the calculation of the MAC value in the MAC value calculating section 504 based on the address and the random number received from the random number generator 502.

Figure 12:
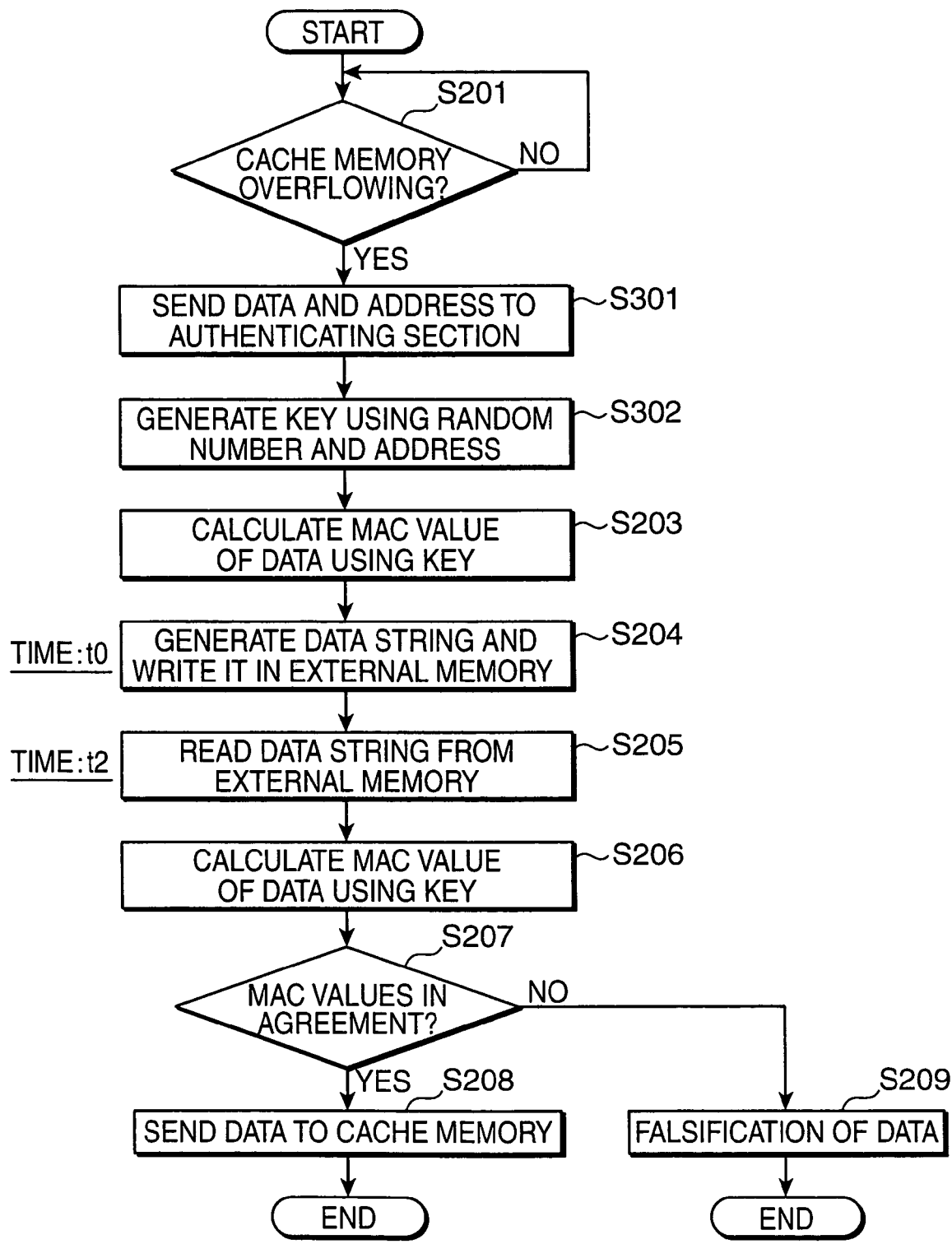
FIG. 12 is a flow chart showing the procedure of operations carried out by the program executing section in order to prevent a splicing attack.

FIG. 12 is a flow chart showing the procedure of operations carried out by the program executing section 40 in order to prevent a splicing attack. First, when a program is being executed in the CPU 50 of the node 10, the overflow of the cache memory 70 is checked (Step S201). In the case of the overflow of the cache memory 70 due to an excessively large data, the data is sent from the cache memory 70 to the authenticating section 80 and the address of the external memory 60 allotted to write this data is sent to the key generator 503 in the authenticating section 80 (Step S301). The key generator 503 generates the key based on the address received from the cache memory 70 and the random number received from the random number generator 502 (Step S302). Since the succeeding processing is the same as the one described with reference to FIG. 9 in the second embodiment, no description is given.

As described above, according to this embodiment, in the case of such a falsification as to overwrite a content at a different address with the data string saved at a certain address of the external memory 60, a wrong key is generated since the written data string is saved at the address different from the original one. Thus, the data falsification can be effectively and securely verified since the MAC value contained in the read data string and the one calculated using the new key do not agree. Further, according to this embodiment, not only the splicing attack shown in FIG. 10, but also the spoofing attack shown in FIG. 7 can be effectively prevented.

Fourth Embodiment

Figure 13:
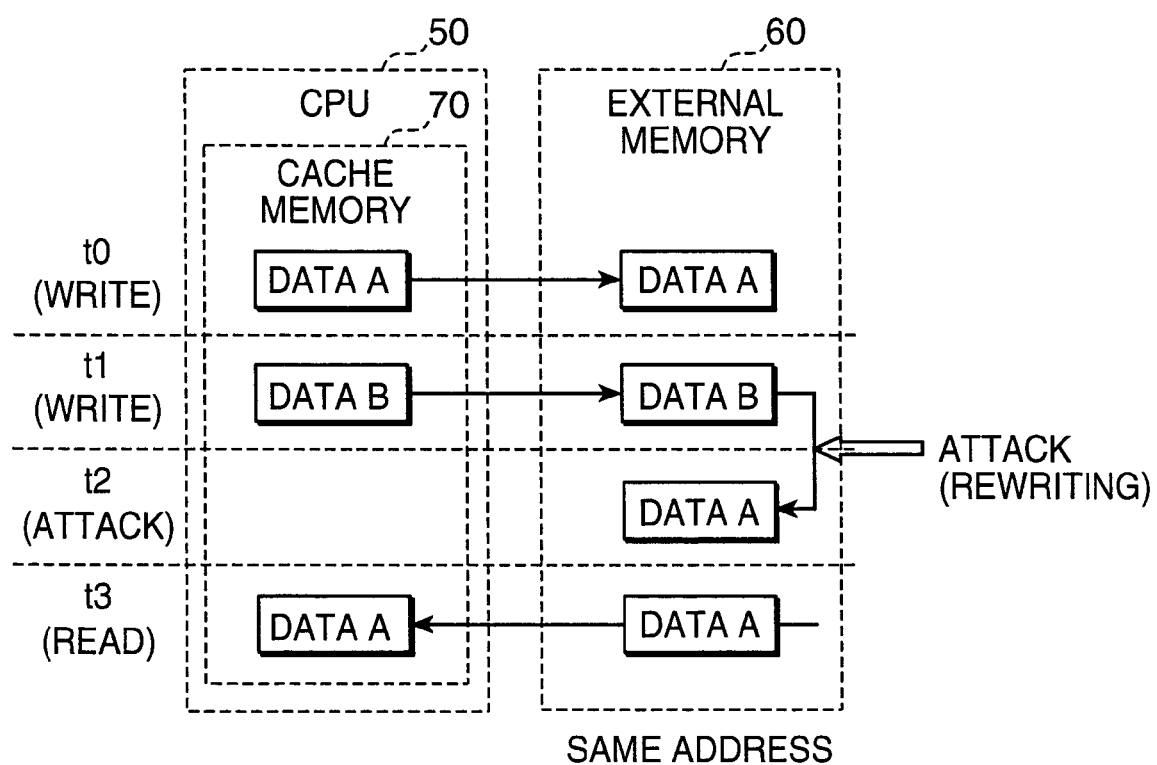
FIG. 13 is a diagram showing one mode of an attack called a replay attack.

FIG. 13 is a diagram showing an attack called a replay attack. At certain time t0, the CPU 50 writes a correct data A saved in the cache memory 70 in the external memory 60. An attacker observes the external memory 60 and saves the written data A. At certain time t1, the CPU 50 overwrites a content at the same address of the external memory 60 with a correct data B saved in the cache memory 70. Thereafter, at certain time t2, the attacker rewrites the data B saved in the external memory 60 with the data A at the same address.

When the CPU 50 reads the data at this address from the external memory 60 at time t3 thereafter, the read data is not the correct data B, but the data A after the falsification (rewriting). However, the same key is used for the calculation of the MAC value because of the same address. Thus, the correct MAC value is calculated and the falsification of the data is not noticed. Therefore, the CPU 50 carries out a wrong processing thereafter, and the execution result of the executed program becomes false. This is an attack called a replay attack.

Figure 14:
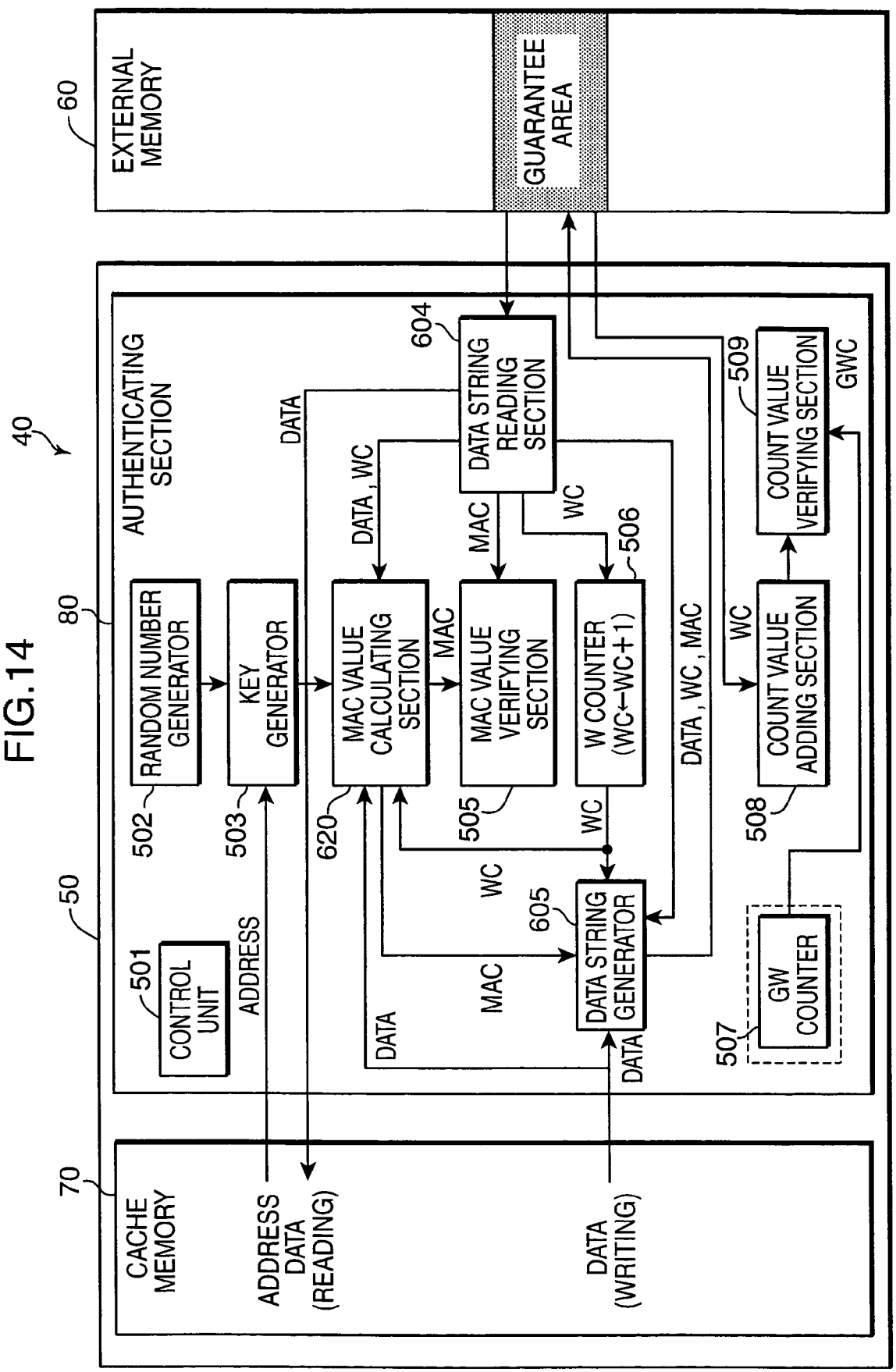
FIG. 14 is a function block diagram showing a program executing section according to a fourth embodiment in detail.

In order to prevent a replay attack of this mode, a counter for counting the number of writing operations made at each address of the guarantee area of the external memory 60 and a counter for counting the number of writing operations the entire CPU made in the external memory 60 are provided in this embodiment. FIG. 14 is a function block diagram showing a program executing section 40 for preventing a replay attack in detail. In FIG. 14, write counters (hereinafter, "W counter") 506, a global write counter (hereinafter, "GW counter") 507, a count value adding section 508 and a count value verifying section 509 are additionally provided in the block diagram of FIG. 11 for the third embodiment.

The W counter (first counting means) 506 is a function section for counting the number of times the CPU 50 wrote data for each address of the external memory 60, and adds (increments) "1" to the count value received from the data string reading section 604 (hereinafter, "WC value") and sends the resulting value to a data string generator 605 by the control of the controller 501. The GW counter (second counting means) 507 includes a register or the like and is a function section for counting the number of times the entire CPU wrote data in the external memory 60. The GW counter 507 adds "1" to the count value (hereinafter, "GWC value") and saves it by the control of the controller 501.

The count value adding section (first count value adding means) 508 obtains the sum total of numbers of times of writing the data at all the addresses in the guarantee area of the external memory 60 and sends it to the count value verifying section 509 when the execution of the program is completed. The count value verifying section (first count value verifying means) 509 compares the sum total of the count values received from the count value adding section 508 and the GWC value received from the GW counter 507, and judges no falsification of the data in the external memory 60 if these values are in agreement.

In this embodiment, the MAC value calculating section 620 calculates the MAC value not from the data, but from both the data and the WC value unlike the second and third embodiments. Further, the data string reading section 604 sends not only the data, but also the WC value to the MAC value calculating section 620. This data string reading section 604 also sends the WC value to the W counter 506. The data string generator 605 generates the data string containing not only the MAC value, but also the WC value.

Figure 15:
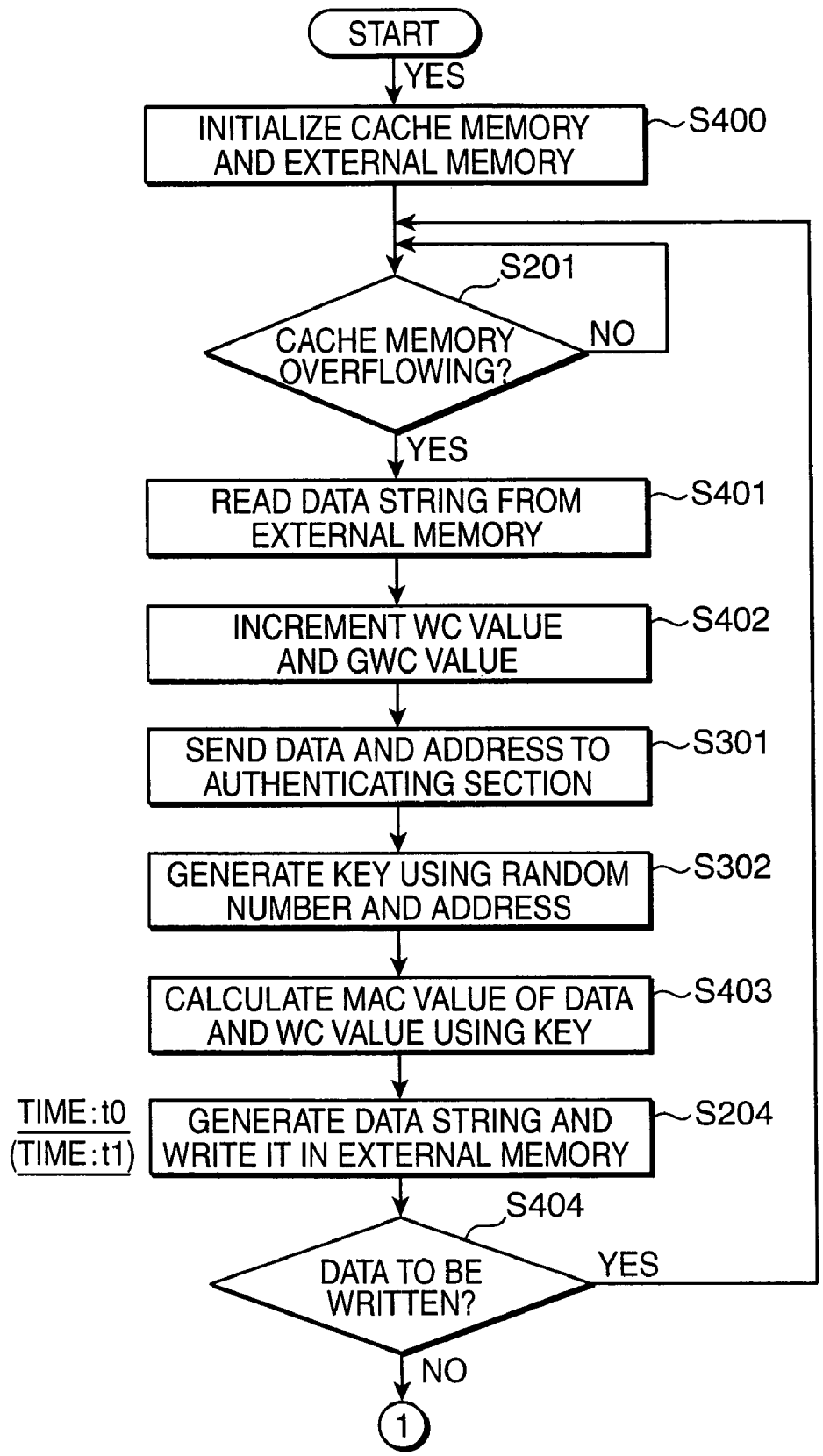
FIGS. 15 and 16 is a flow chart showing the procedure of operations carried out by the program executing section in order to prevent the one mode of a replay attack.
Figure 16:
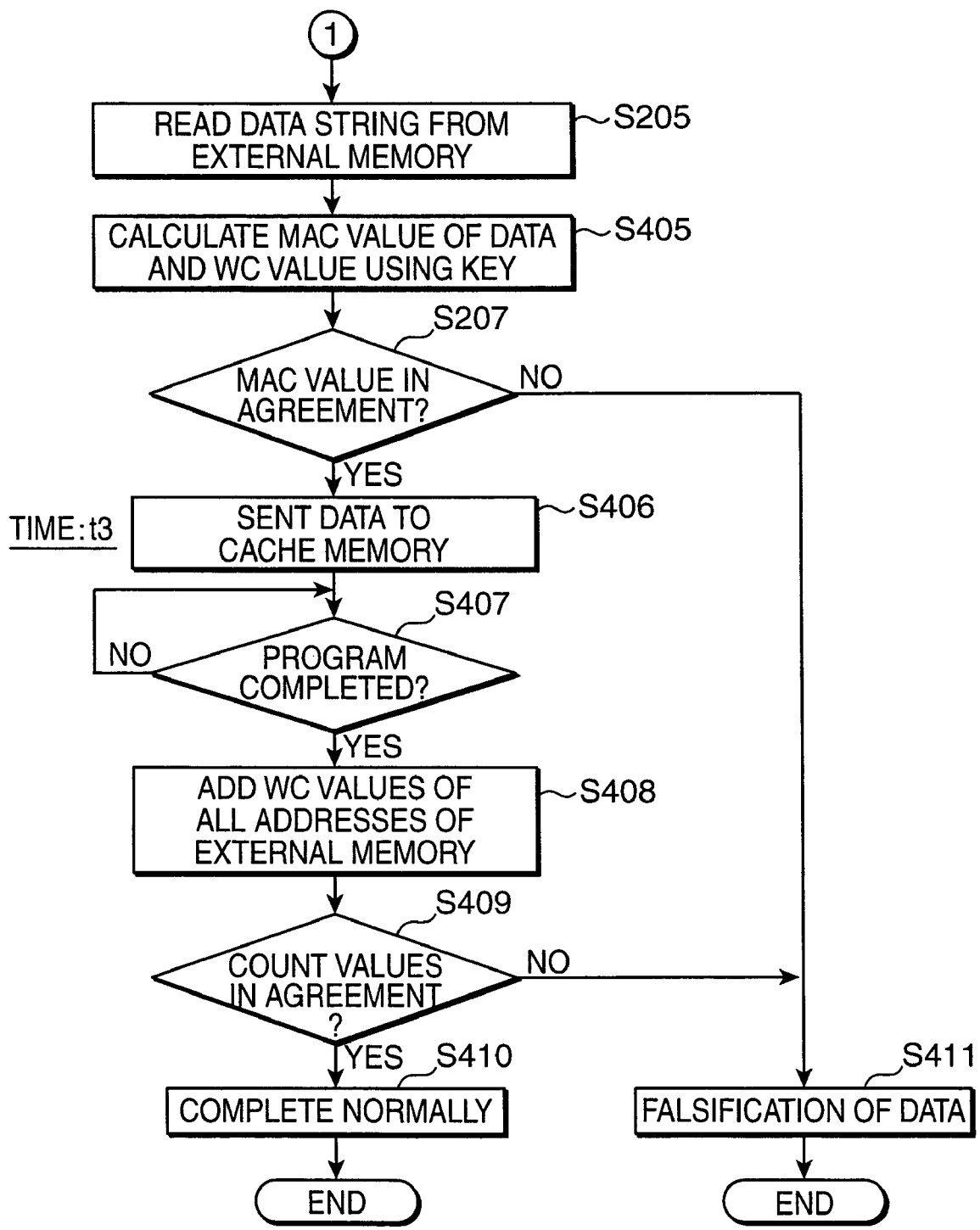

FIGS. 15 and 16 are a flow chart showing the procedure of operations of the program executing section 40 to prevent one mode of the replay attack according to this embodiment. First, upon the switch to the secure mode in Step S101 of FIG. 3, the CPU 50 initializes all the data and all the WC values (written in data fields and counter fields) in the guarantee area of the external memory 60. Thus, the WC values are assumed to be "0" at all the addresses. Further, the CPU 50 simultaneously initializes the count values of the GW counter 507 to set them to an initial value "0" (Step S400).

In this state, during the execution of the CPU 50 of the node 10, whether or not the cache memory 70 overflows is checked (Step S201). As a result of this check, if the cache memory 70 overflows due to a large data, the data string reading section 604 reads the already saved data string from the address of the external memory 60 allotted to write the data (Step S401).

Subsequently, the data string reading section 604 extracts the WC value from the read data string and sends it to the W counter 506. Upon receiving this WC value, the W counter 506 adds "1" to the WC value (Step S402) and sends the resulting value to the data string generator 605. At this time, the GW counter 507 also adds "1" to the GWC value saved therein. For example, it is assumed that the WC value extracted from the data string read from the above address of the external memory 60 still takes the initial value "0" at this point of time. In such a case, the W counter 506 increments the WC value from "0" to "1" and sends the resulting value to the data string generator 605. Similarly, the GW counter 507 increments its own count value from "0" to "1" and saves the resulting value.

Subsequently, the data and the address of the external memory 60 allotted to write this data are sent to the authenticating section 80 (Step S301). Then, the key generator 503 generates the key using the above address and the random number generated in the random number generator 502 (Step S302). The MAC value calculating section 620 calculates the MAC value, which is a collection of the data received from the cache memory 70 and the WC value received from the W counter 506, using the key received from the key generator 503 (Step S403), and sends this MAC value to the data string generator 605. Upon receiving the MAC value, the data string generator 605 compiles the data, the WC value and the MAC value into one data string, encrypts this data string, and then writes the encrypted data string in the external memory 60 (Step S204). Subsequently, this routine returns to Step S201 to repeat a processing similar to the above if there is still any data to be written in the external memory 60 (YES in Step S404).

The write processing thus far corresponds to the processing at time t0 and time t1 of FIG. 13. In Step S402 of the second write processing, the W counter 506 increments the WC value from "1" to "2" and sends the resulting value to the data string generator 605. Similarly, the GW counter 507 increments its own count value from "1" to "2" and saves the resulting value. In other words, the WC value of the data A written in the external memory 60 at time t0 of FIG. 13 is "1" and that of the data B written in the external memory 60 at time t1 is "2".

Thereafter, at time t3, the data string reading section 604 reads the data string from the same address as the one for the data strings written at time t0 and time t1 (Step S205). The data string reading section 604 sends the data and the WC value contained in this data string to the MAC value calculating section 620 and sends the MAC value contained in this data string to the MAC value verifying section 505 after decryption. The MAC value calculating section 620 calculates the MAC value, which is a collection of the data received from the data string reading section 604 and the WC value, using the key received from the key generator 503 (Step S405).

The MAC value verifying section 505 compares the MAC value received from the data string reading section 604 and the one received from the MAC value calculating section 620 (Step S207). As a result of this comparison, if the two MAC values are at variance (NO in Step S207), the MAC value verifying section 505 judges that the data string was falsified in the external memory 60 (Step S411). On the other hand, if these two MAC values are in agreement (YES in Step S207), the MAC value verifying section 505 judges that no data string was falsified in the external memory 60 and makes a corresponding notification to the controller 501. The controller 501 causes the data string reading section 604 to send the data to the cache memory 70 based on the notification from the MAC value verifying section 505 (Step S406).

Thereafter, when the execution of the program is completed (YES in Step S407), the count value adding section 508 reads the data strings at all the addresses of the guarantee area of the external memory 60 and calculates the sum total of the WC values included in the guarantee area (Step S408). The sum total of the WC values calculated by the count value adding section 508 and the GWC value saved in the GW counter 508 are both sent to the count value verifying section 509. If the address used to execute the program is the only address shown in FIG. 13, this sent WC value is "2" contained in the data B unless the rewriting by an attacker was made at arbitrary time t2 between time t1 and time t3 in FIG. 13 while being "1" if the data A was rewritten. The GWC value saved in the GW counter 507 is "2" in each case.

Accordingly, the count value verifying section 509 compares the sum total of the WC values and the GWC value, and ends the processing (Step S410) while judging that the program was normally executed without having the data falsified if these two values are in agreement (both values are "2" in the above example) (YES in Step S409). On the other hand, the count value verifying section 509 ends the processing (Step S411) while judging that the data were falsified in the external memory 60 if the sum total of the WC values and the GWC value are at variance (the sum total of the WC value is "1" and the GWC value is "2" in the above example) (NO in Step S409).

As described above, according to this embodiment, even if such a falsification was made as to overwrite a data string saved at a certain address of the external memory 60 with the data string previously saved at the same address, the number of the writing operations the writing means made in the external memory 60 differ between the correct data string and the overwritten data string. Thus, the numbers of times contained in these data strings differ, whereby the falsification of the data string can be effectively and securely verified. Further, according to this embodiment, not only the replay attack shown in FIG. 13, but also the spoofing attack shown in FIG. 7 and the splicing attack shown in FIG. 10 can be effectively prevented.

Fifth Embodiment

Figure 17:
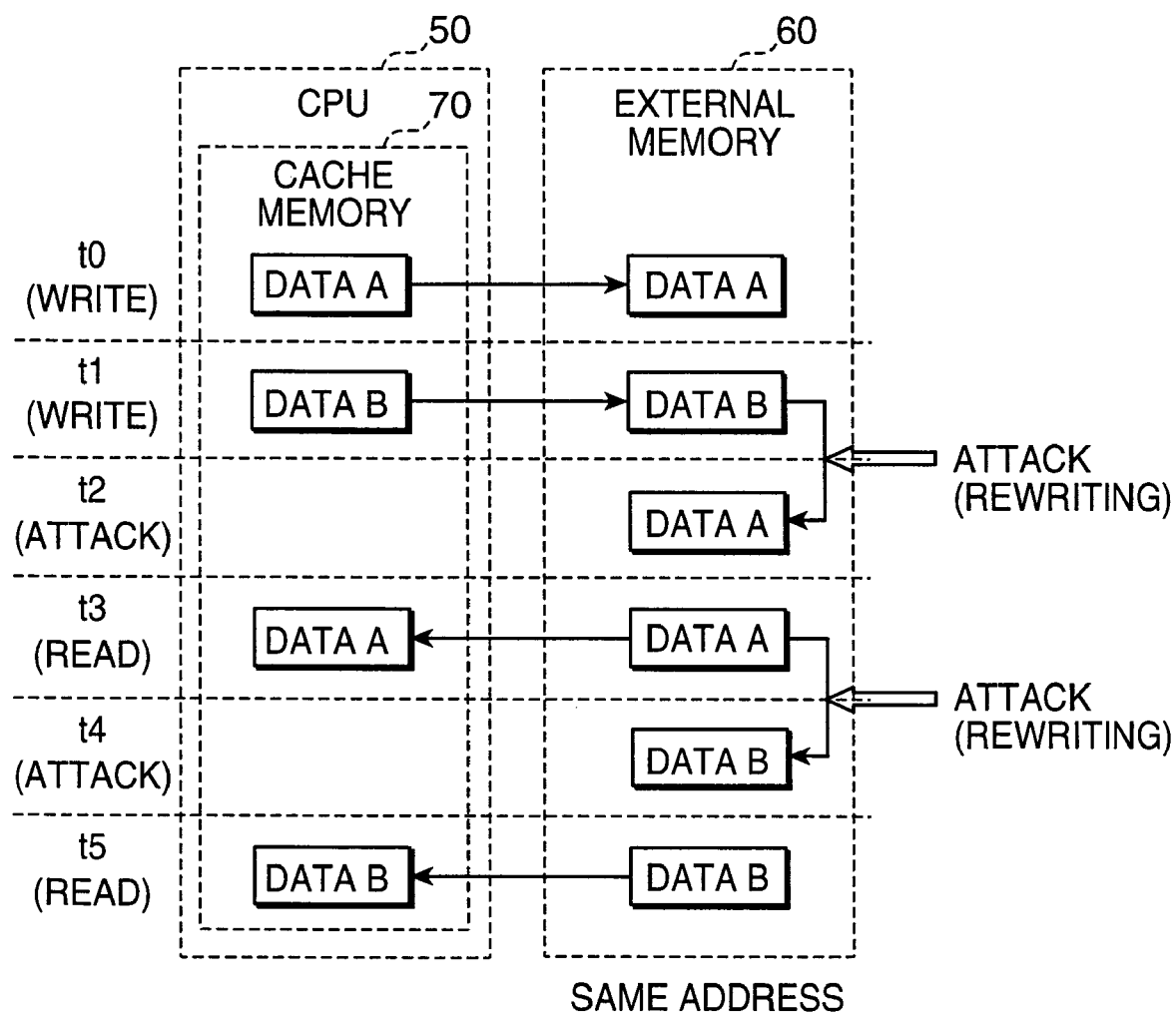
FIG. 17 is a diagram showing another mode of an attack called a replay attack.

FIG. 17 is a diagram showing another mode of the attack called a replay attack. At certain time t0, the CPU 50 writes a correct data A saved in the cache memory 70 in the external memory 60. An attacker observes the external memory 60 and saves the written data A. At time t1 thereafter, the CPU 50 overwrites the data A at the same address of the external memory 60 with a correct data B saved in the cache memory 70. The attacker further observes the external memory 60 and saves the written data B. Then, at time t2 thereafter, the attacker rewrites the data B saved in the external memory 60 with the data A at the same address. At time t3 thereafter, when the CPU 50 reads the data from this address of the external memory 60, the read data is not the correct data B, but the data A after the falsification.

However, if the attacker rewrites the data A saved at the same address of the external memory 60 with the data B at time t4 thereafter and the CPU 50 reads the data from this address of the external memory 60 at time t5 thereafter, the CPU 50 does not notice the falsification of the data during the execution of the program since the read data is the data B, which is supposed to be read. With another mode of the replay attack, the CPU 50 carries out a wrong processing and the execution result of the executed program becomes false, but it is difficult to detect.

In order to prevent a replay attack of this mode, a counter for counting the number of reading operations the CPU 50 made from the external memory 60 instead of counting the number of writing operations the CPU 50 made in the external memory 60 as the W counter 506 and the GW counter 507 of the fourth embodiment do is provide in this embodiment. In this embodiment, even in the case of a writing operation from the cache memory 70 in the external memory 60, a reading from the address of the external memory 60 as a writing end is first made. Accordingly, the number of the reading operations the CPU 50 made the external memory 60 represents the number of the writing and the reading operations.

Figure 18:
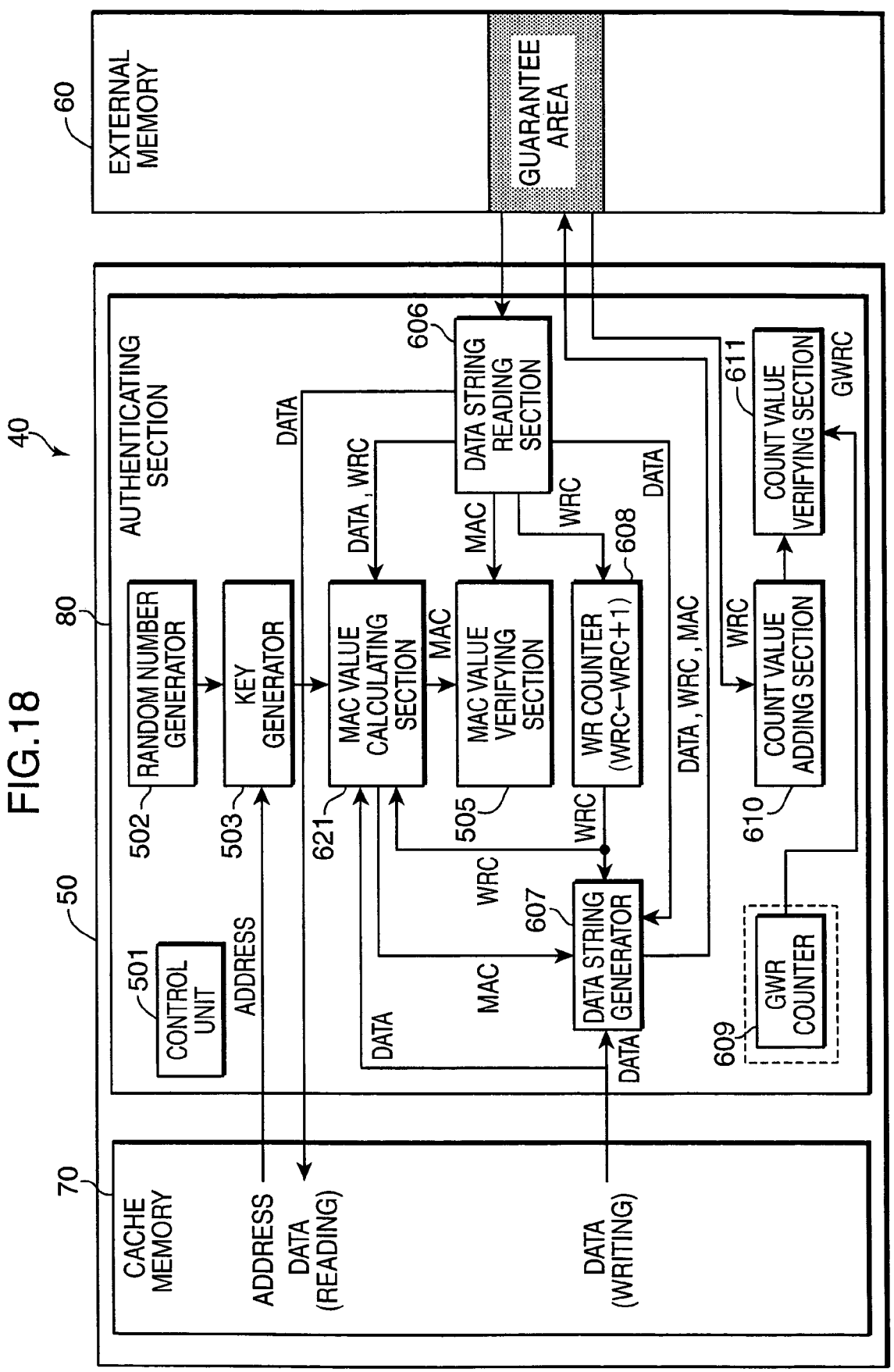
FIG. 18 is a function block diagram showing a program executing section according to a fifth embodiment in detail.

FIG. 18 is a function block diagram showing a program executing section 40 for preventing one mode of the replay attack according to this embodiment in detail. In FIG. 18, a write/read counter (hereinafter, "WR counter") 608 is provided in place of the W counter 506 of the fourth embodiment, and a global write/read counter (hereinafter, "GWR counter") 609 is provided in place of the GW counter 507. Count values counted by the WR counter (third counting means) 608 and the GWR counter (fourth counting means) 609 are referred to as a WRC value and a GWRC value, respectively.

Further, a count value adding section (second count value adding means) 610 calculates a sum total of the WRC values in a guarantee area of the external memory 60 when the execution of the program is completed. Furthermore, a count value verifying section (second count value verifying means) 611 compares the sum total of the WRC values received from the count value adding section 610 and the GWRC value received from the GWR counter 609, and judges that no data string was falsified in the external memory 60 if these values are in agreement. Values inputted to a MAC value calculating section 621 and a data string reading section 606 or those sent from the MAC value calculating section 621 and the data string reading section 606 are likewise not WC values, but WRC values.

Figure 19:
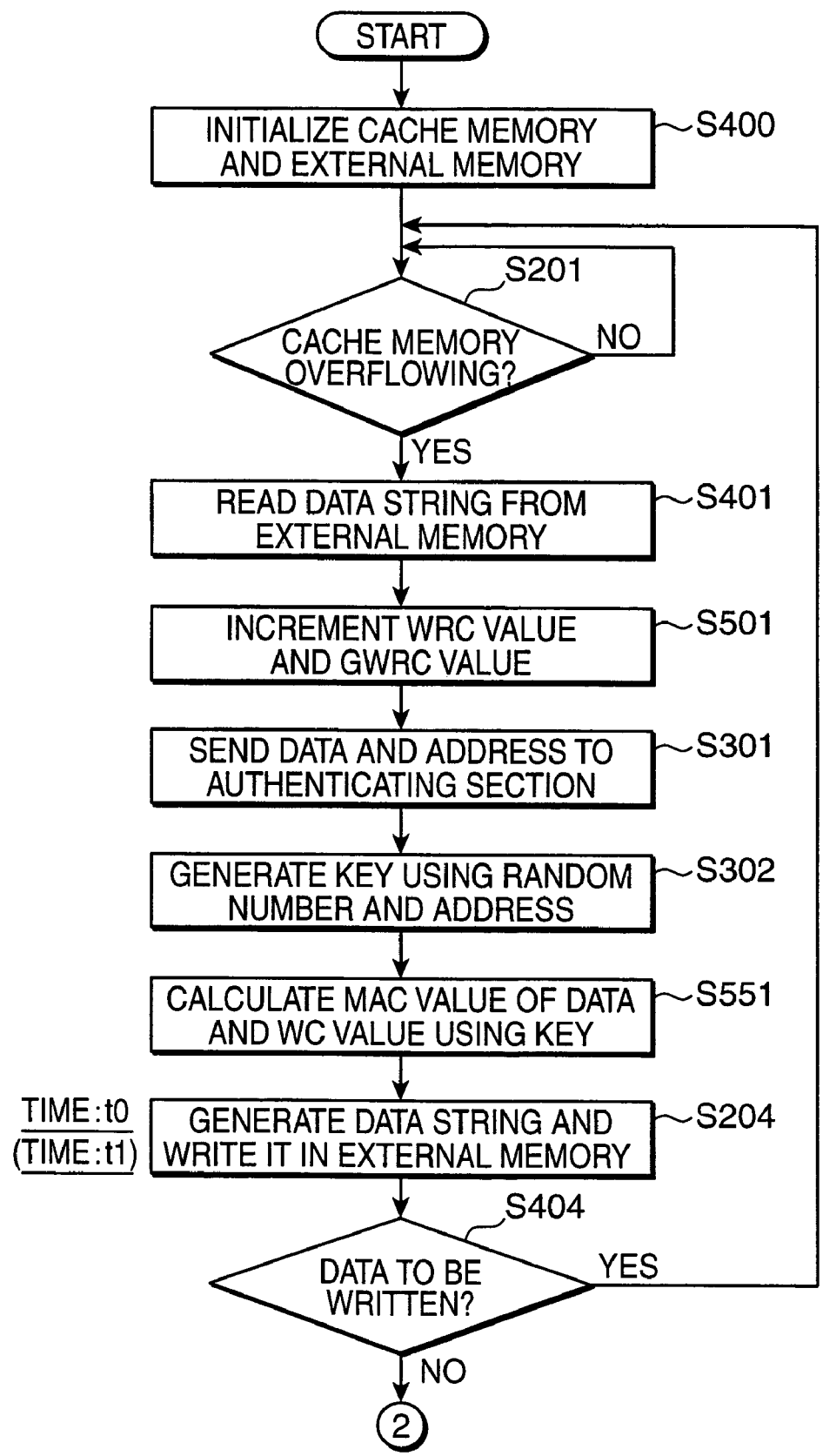
FIG. 19 is a flow chart showing the procedure of operations carried out by the program executing section in order to prevent still another mode of the replay attack.
Figure 20:
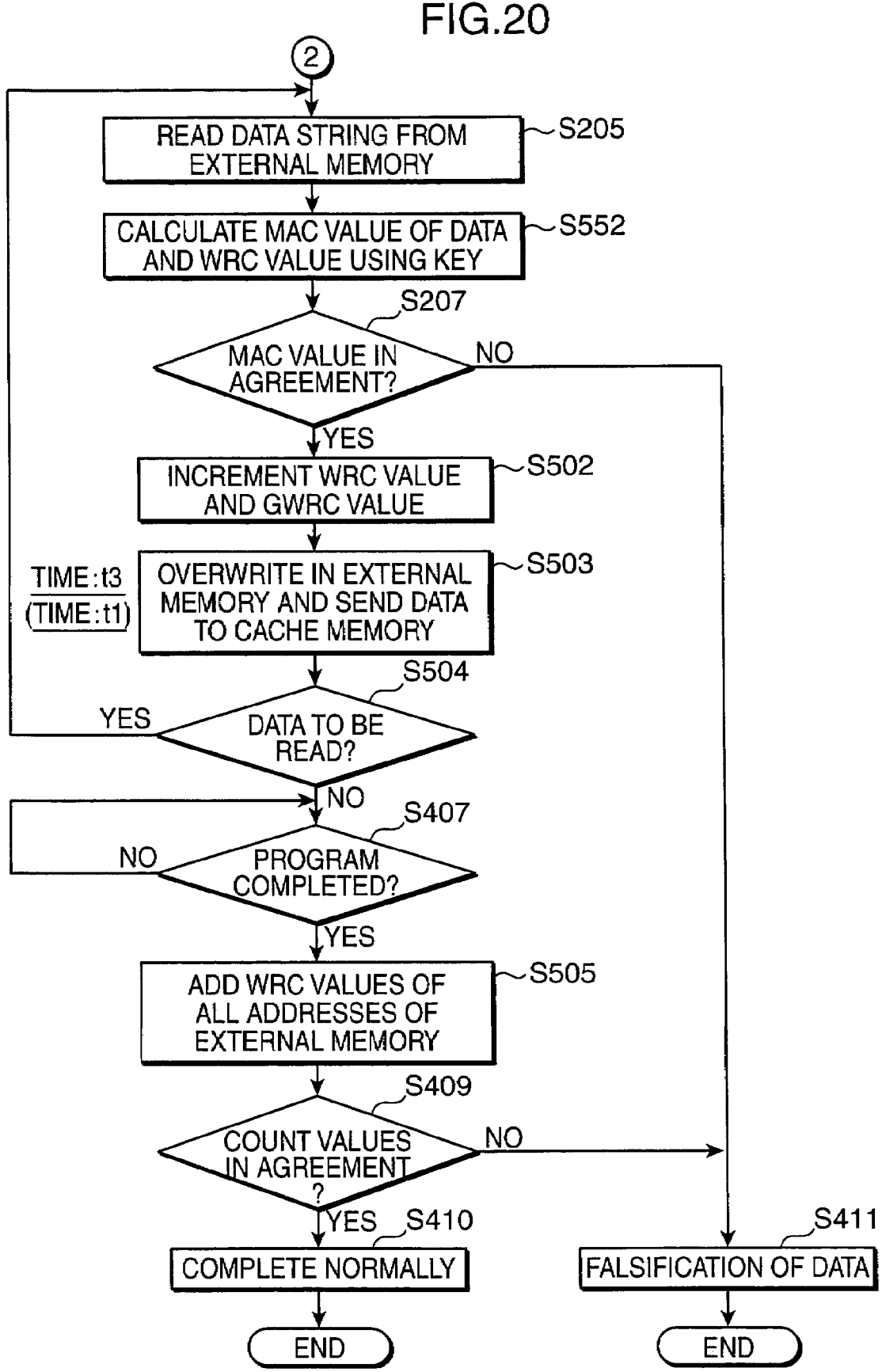
FIG. 20 is a flow chart showing the procedure of operations carried out by the program executing section in order to prevent further another mode of the replay attack.

FIGS. 19 and 20 are a flow chart showing the procedure of operations carried out by the program executing section 40 to prevent one mode of the replay attack according to this embodiment. Although the basic procedure is same as in the foregoing fourth embodiment, the number of write and read processings is counted, i.e. the WRC values and the GWRC values are counted instead of the WC values and the GWC values in this embodiment. Thus, this procedure differs from the one of the fourth embodiment in that the WR counter 608 increments the WRC value and the GWR counter 609 increments the GWRC value in Step S501 and that a MAC value of the data and the WRC value is calculated in Steps S551 and S552. Since there is no difference to the fourth embodiment at the time of writing, the WRC value contained in the data A written at time t0 of FIG. 17 is "1" and the WRC value contained in the data B written at time t1 is "2" if the initial value is same as in the fourth embodiment. Further, the GWRC value saved in the GWR counter 609 is "2".

In the read processing at time t3 of FIG. 17, if no rewriting by an attacker is made at arbitrary time t2 between time t1 and time t3, the WRC value "2" contained in the data B read by the data string reading section 606 in Step S205 is incremented to to "3" by the WR counter 608. Simultaneously, the GWRC value saved in the GWR counter 609 is incremented to from "2" to "3" (Step S502). Subsequently, the MAC value calculating section 621 calculates a MAC value of the data received from the data string reading section 606 and the WRC value received from the WR counter 608 and sends the calculated MAC value to a data string generator 607. The data string generator 607 writes the data received from the data string reading section 606, the WRC value ("3") received from the WR counter 608, and the MAC value received from the MAC value calculating section 621 together at the address from which the data is read at time t3 (Step S503).

On the other hand, if the attacker rewrote the data with the data A at time t2 of FIG. 17, the WRC value "1" contained in the data A read by the data string reading section 606 in Step S205 is incremented to to "2" by the WR counter 608, but the GWRC value is incremented to from the value "2" saved at this point of time to "3" (Step S502). In other words, in the case of the data falsification by the attacker, the count values of the WR counter 608 and the GWR counter 609 differ at this time of reading.

If the attacker rewrote the data with the data A at time t2 of FIG. 17 and further rewrites the data A with the data B at arbitrary time t4 between time t3 and time t5, the WRC value "2" contained in the data B is incremented to "3" by the WR counter 608 in the read processing at time t5 (YES in Step S504). Simultaneously, the GWRC value is incremented to from the value "3" saved in the GWR counter 609 at this point of time to "4" (Step S502).

On the other hand, if no data falsification was made either at time t2 or time t4, the WRC value is incremented to from the value "2" contained in the data B to "3" at time t3, and further incremented to from the value "3" contained in the data B to "4" at time t5. Further, the GWRC value saved in the GWR counter 609 is "4" regardless of whether there was the data falsification at time t2 or t4.

Accordingly, when the execution of the program is completed, the count value adding section 610 calculates a sum total of the WRC values of all the addresses of the guarantee area of the external memory 60 and sends it to the count value verifying section 611. The count value verifying section 611 compares the sum total of the WRC values received from the count value adding section 610 and the GWRC value received from the GWR counter 609, and ends the processing (Step S410) while judging that the program was normally executed without having the data falsified if these values are in agreement (both values are "4" in the above example) (YES in Step S409). On the other hand, if the sum total of the WRC values and the GWRC value are at variance (sum total of the WRC values is "3" and the GWRC value is "4" in the above example) (NO in Step S409), the processing is ended (Step S411) while judging that the data were falsified in the external memory 60.

As described above, according to this embodiment, even if such a falsification as to rewrite the data string saved at a certain address of the external memory 60 with a data string previously saved at this address and to overwrite this false data at this address with the correct data before the execution of the program is completed should be made, the number of the reading operations the reading means made from the external memory 60 differs between the correct data string and the overwritten data string. Thus, the numbers of the reading operations contained in these data strings differ, wherefore the data falsification can be effectively and securely verified. Further, according to this embodiment, not only the replay attack shown in FIG. 17, but also the spoofing attack shown in FIG. 7, the splicing attack shown in FIG. 10 and the replay attack shown in FIG. 13 can be effectively prevented.

Sixth Embodiment

As described above, according to the fifth embodiment, the MAC value of the data and the count value (WRC value) is calculated and saved in the external memory 60, whereby not only the replay attack shown in FIG. 17, but also the spoofing attack shown in FIG. 7, the splicing attack shown in FIG. 10 and the replay attack shown in FIG. 13 can be effectively prevented. Another embodiment according to which the above attacks can be effectively prevented without saving this MAC value in the external memory 60 is described below.

Figure 21:
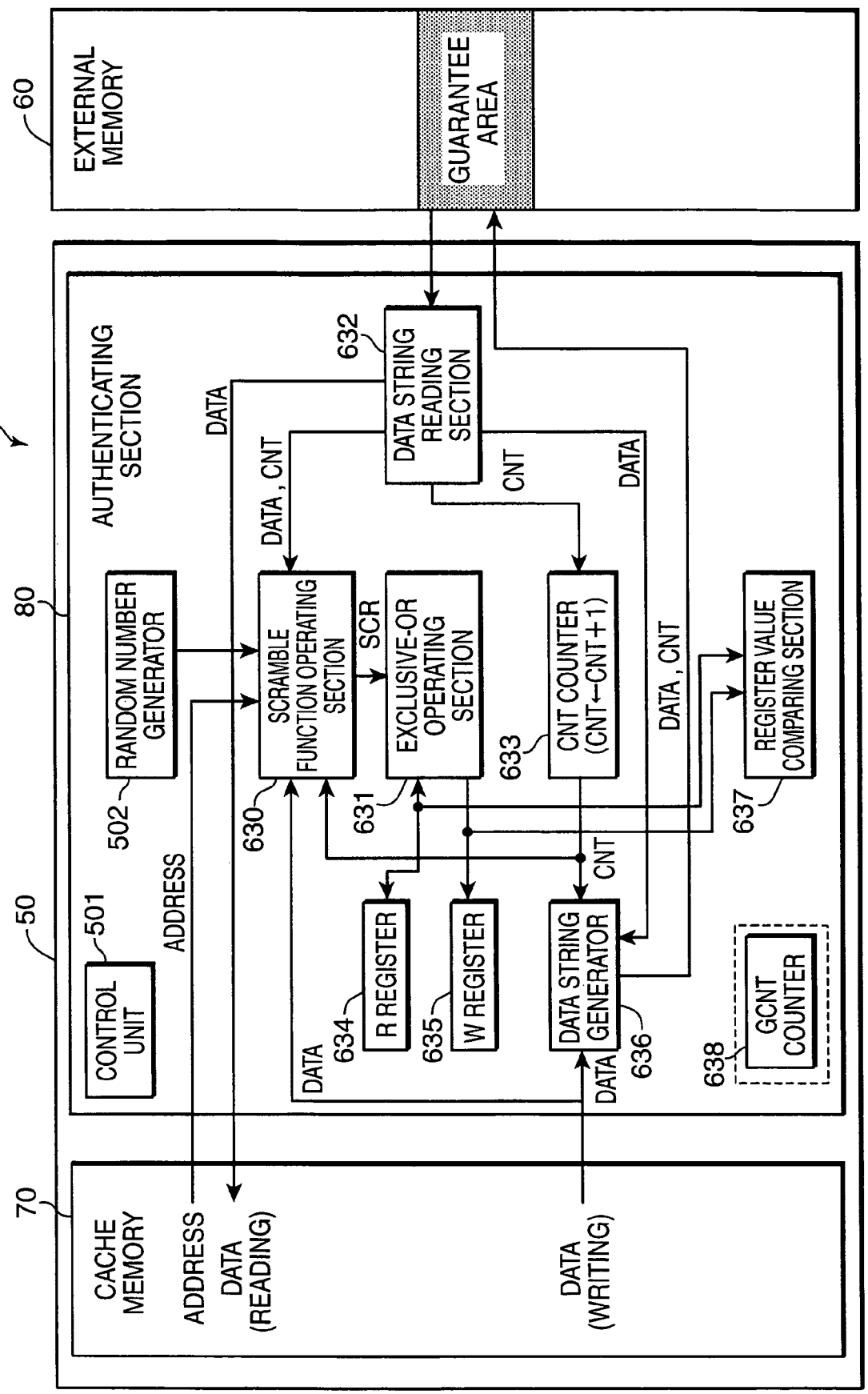
FIG. 21 is a function block diagram showing a program executing section according to a sixth embodiment in detail.

FIG. 21 is a function block diagram showing a program executing section 40 according to the sixth embodiment in detail. A data string reading section 632 reads a data string from a specified address of the external memory 60, sends a data contained in this data string to the cache memory 70 and a data string generator 636, and sends a count value (CNT value) contained in this data string to a CNT counter 633. Further, the data string reading section 632 sends the data and the CNT value contained in this data string to a scramble function calculating section 630.

The CNT counter (third counting means) 633 is a counter for each address. Upon receiving the CNT value from the data string reading section 632, the CNT counter 633 adds "1" to the received CNT value and sends the resulting value to the data string generator 636 and the scramble function calculating section 630. In other words, every time a write processing or a read processing is carried out, the CNT value is incremented to by "1." for each address where the processing is carried out. Further, an authenticating section 80 includes a global CNT counter (hereinafter, "GCNT counter") (fourth counting means) 638 for counting the number of the write and read processings made for all the addresses in the guarantee area of the external memory 60.

The data string generator 636 compiles a data read from the cache memory 70 and the CNT value received from the CNT counter 633 into one data string and writes this data string at a specified address in the guarantee area of the external memory 60 during the write processing. On the other hand, the data string generator 636 compiles a data read from the data string reading section 632 and the CNT value received from the CNT counter 633 into one data string and writes this data string at a specified address in the guarantee area of the external memory 60 during the read processing.

The scramble function calculating section (scramble function calculating means) 630 encrypts the data and the CNT value received from the data string reading section 632, and the address where this data and the CNT value were saved through the operation of a scramble function during the read processing while encrypting the data received from the cache memory 70, the CNT value received from the CNT counter 633 and the address where this data and the CNT value are to be saved through the operation of the scramble function during the write processing. At this time, a random number received from the random number generator 502 is used as a key. Accordingly, how an argument (data, CNT value and address) of the input is encrypted depends on the key, but an external attacker cannot observe this value since it is stored in the CPU.

Here, the scramble function is a function whose output value (SCR value) cannot be known without knowing a key even if the argument of the input is known. In this embodiment, a case where an AES (advanced encryption standard) used in the common key cryptosystem is used as one example of the scramble function is described.

A read register (hereinafter, "R register")(read history storage means) 634 and a write register (hereinafter, "w register") (write history storage means) 635 store read and write history information between the cache memory 70 and the external memory 60. An exclusive-or operation result of the last register value and the SCR value sent from the scramble function calculating section 630 is stored in these registers.

The exclusive-or calculating section (exclusive-or calculating means) 631 performs an exclusive-or operation of the SCR value which is an operation result of the scramble function received from the scramble function calculating section 630 and the resister value of the R register 634 or the W register 635, and the register value of the R register 634 or the W register 635 is renewed to the calculation result. Here, the exclusive-or operation is such an operation that, for example, in the case of two inputs, an output is true ("1") when only either one of the inputs is true ("1") while being false ("0") when both inputs are true ("1") or false ("0").

A register value comparing section (history comparing means) 637 receives the register values from the R register 634 and the W register 635 to judge whether or not they are in agreement upon the execution proof after the execution of the program is completed in the node 10. In this embodiment, the controller 501 has a function as count value judging means and judging means.

Figure 22:
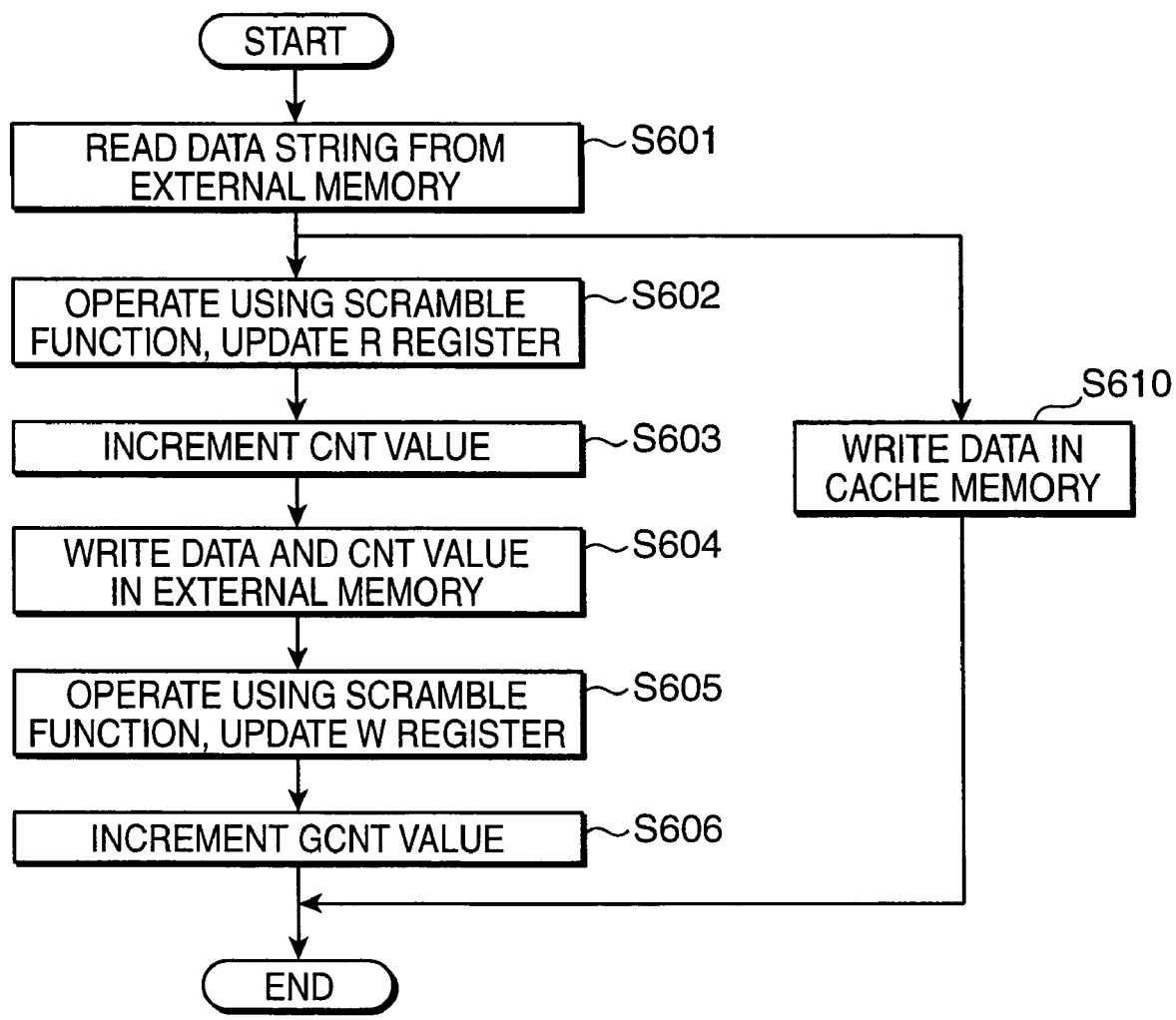
FIG. 22 is a flow chart showing the procedure of data reading from an external memory to a cache memory according to the sixth embodiment.
Figure 23:
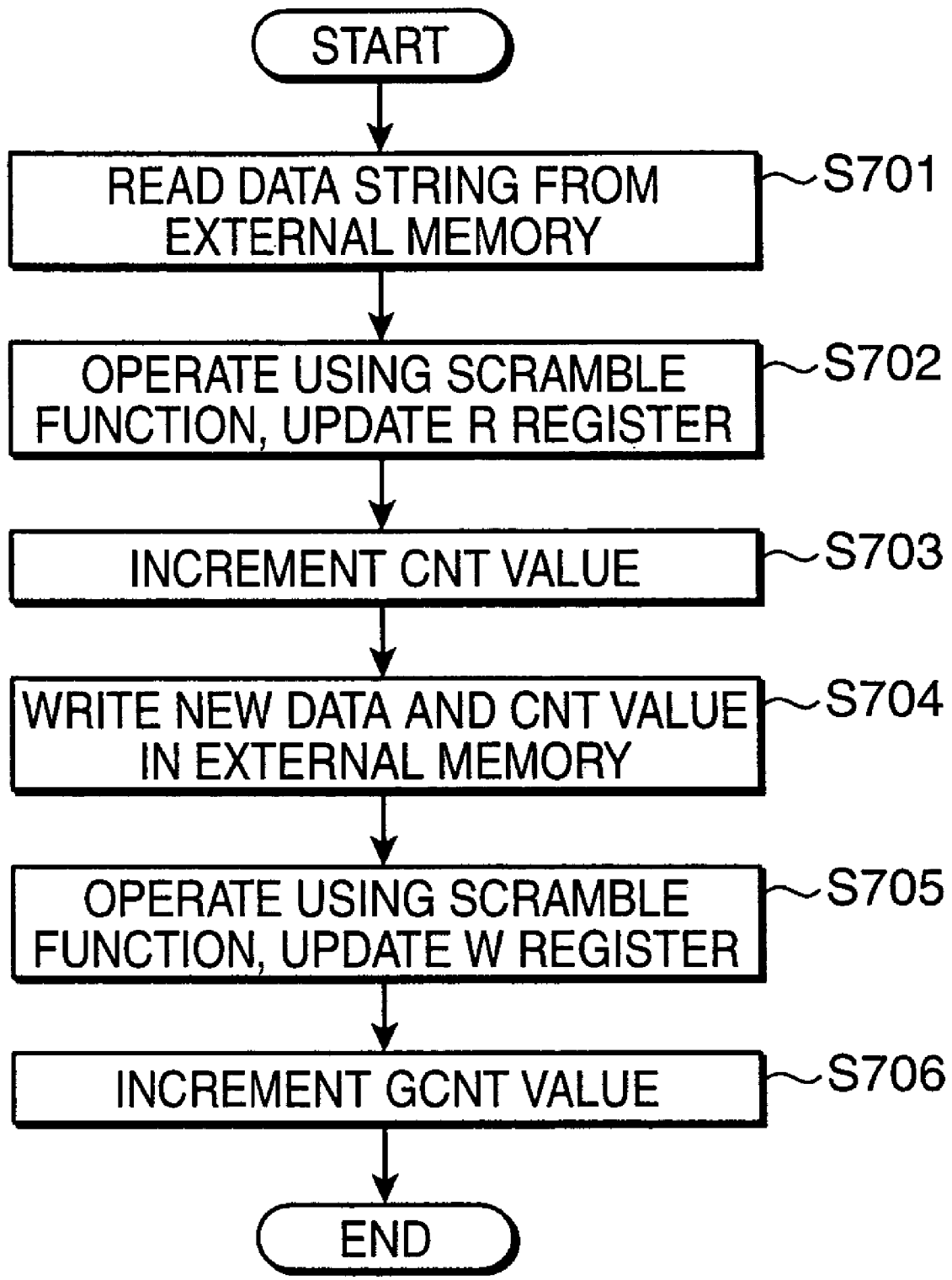
FIG. 23 is a flow chart showing the procedure of data reading from the cache memory to the external memory according to the sixth embodiment.
Figure 24:
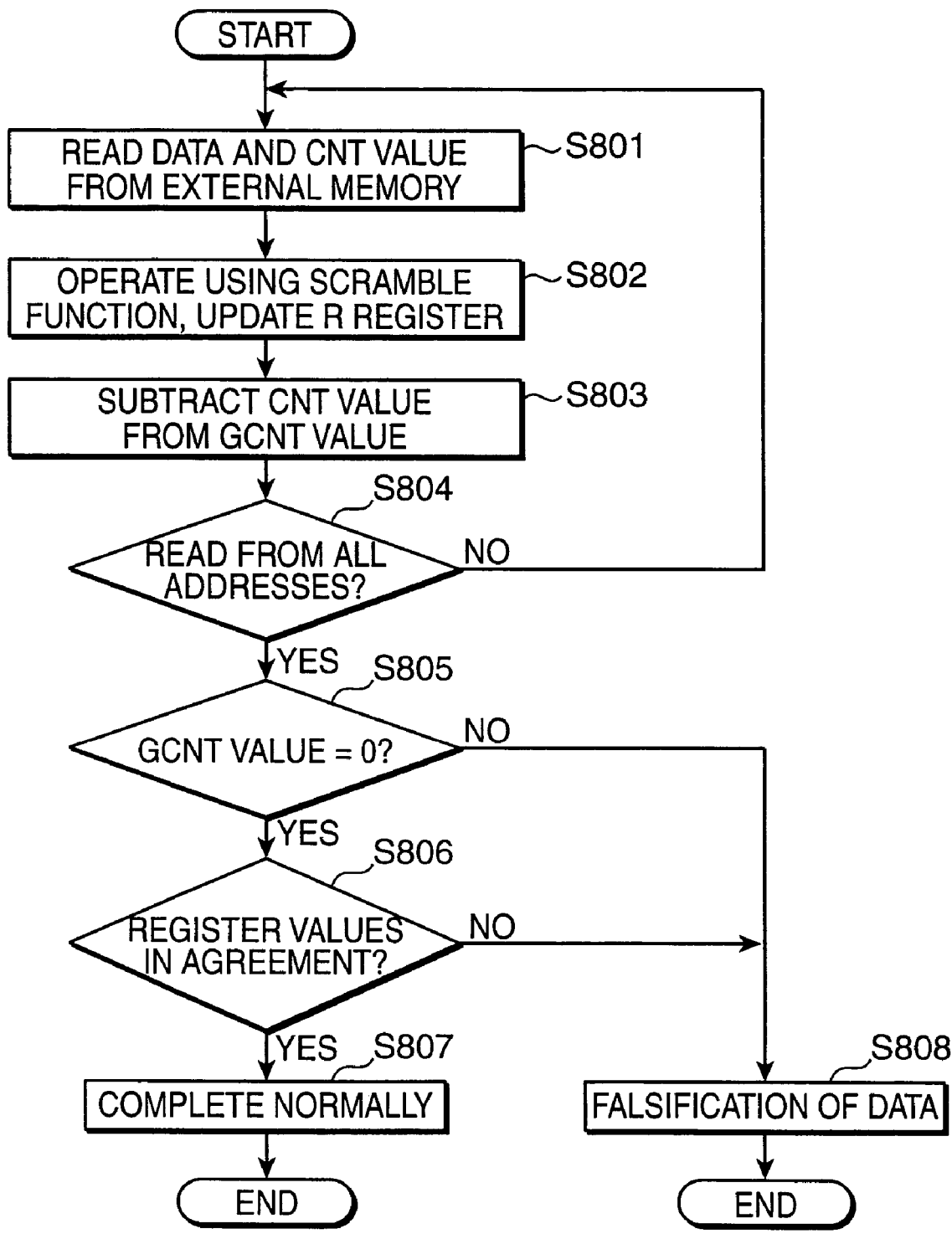
FIG. 24 is a flow chart showing the procedure of a program execution proving processing according to the sixth embodiment.

FIGS. 22, 23 and 24 are flow charts showing the procedures of the read, write and verify processings carried out by the program executing section 40 according to this embodiment, respectively. In this embodiment, the guarantee area of the external memory 60 is first initialized after the program execution proof is requested from the server 20 and the mode is switched to the secure mode. This means that the CPU 50 sets all the data and all the count values (CNT values) within the guarantee area, for example, to "0". Simultaneously, the values of the R register 634, the W register 635 and the GCNT counter 638 are also initialized.

First, the processing of reading a data from the external memory 60 to the cache memory 70 shown in FIG. 22 is described. Upon reading a data string from a specified address of the external memory 60 (Step S601), the data string reading section 632 sends the data contained in this data string to the cache memory 70 (Step S610). In this way, the read processing from the external memory 60 to the cache memory 70 is completed. However, in this embodiment, it is assumed that the following processing is carried out in parallel with this processing.

The scramble function calculating section 630 performs an operation of the data received from the data string reading section 632, the CNT value and the address where this data and the CNT value were saved using a scramble function and sends the SCR value as an output result to the exclusive-or calculating section 631. The exclusive-or calculating section 631 receives the current register value from the R register 634 and performs an exclusive OR operation of this register value and the SCR value received from the scramble function calculating section 630. The exclusive-or calculating section 631 overwrites the current register value of the R register 634 with the obtained operation result, thereby renewing the register value of the R register 634 (Step S602).

Subsequently, the CNT counter 633 adds "1" to the CNT value received from the data string reading section 632 (Step S603) and sends the resulting value to the data string generator 636. The data string generator 636 compiles the data received from the data string reading section 632 and the CNT value received from the CNT counter 633 into one data string and writes this data string at the address where the data string read by the data string reading section 632 was saved (Step S604).

Subsequently, the scramble function operating section 630 performs an operation of the data received from the data string reading section 632, the incremented CNT value received from the CNT counter 633 and the address where this data was saved using the scramble function, and sends the resulting SCR value to the exclusive-or calculating section 631. The exclusive-or calculating section 631 receives the current register value from the W register 635, and performs an exclusive-or operation of this register value and the SCR value received from the scramble function calculating section 630. Then, the exclusive-or calculating section 631 overwrites the register value of the W register 635 with the obtained operation result, thereby renewing the register value of the W register 635 (Step S605). Finally, the controller 501 adds "1" to the GCNT value which is a count value of the GCNT counter 638 (Step S606) and ends the read processing.

Next, the processing of writing the data from the cache memory 70 in the external memory 60 shown in FIG. 23 is described. First, upon reading a data string from an address of the external memory 60 where a new data is to be saved (Step S701), the data string reading section 632 sends a data and a CNT value contained in this data string to the scramble function calculating section 630. Hereinafter, as in Step S602 of FIG. 22, the register value of the R register 634 is renewed (Step S702).

Subsequently, the CNT counter 633 adds "1" to the CNT value received from the data string reading section 632 (Step S703) and sends the resulting value to the data string generator 636. The data string generator 636 compiles the new data received from the cache memory 70 and the CNT value received from the CNT counter 633 into one data string and writes this data string at the address where the data string read by the data string reading section 632 was saved (Step S704).

Subsequently, the scramble function calculating section 630 performs an operation of the new data received form the cache memory 70, the incremented CNT value received from the CNT counter 633 and the address where this data was saved, using the scramble function, and sends the resulting SCR value to the exclusive-or calculating section 631. The exclusive-or calculating section 631 receives the current register value from the W register 635 and performs an exclusive-or operation of this register value and the SCR value received from the scramble function calculating section 630. Then, the exclusive-or calculating section 631 overwrites the register value of the W register 635 with the obtained operation result, thereby renewing the register value of the W register 635 (Step S705). Finally, the controller 501 adds "1" to the GCNT value which is a count value of the GCNT counter 638 (Step S706) and ends the read processing.

Finally, the procedure of the program execution proof carried out upon ending the secure mode is described with reference to FIG. 24. First, upon reading a data string from a certain address of the external memory 60 (Step S801), the data string reading section 632 sends a data and a CNT value contained in this data string to the scramble function calculating section 630. Hereinafter, as in Step S602 of FIG. 22 and Step S702 of FIG. 23, the register value of the R register 634 is renewed (Step S802). Subsequently, the controller 501 subtracts the CNT value from the GCNT value saved in the GCNT counter 638 (Step S803). The above operations of Step S801 to Step S803 are performed for the certain address. After these operations are performed for all the addresses in the guarantee area (YES in Step S804), the following verify processing is entered.

Subsequently, the controller 501 refers to the GCNT counter 638 to judge whether or not the GCNT value saved therein is "0" (Step S805). As described above, the CNT value is counted for each address and the value is increased every time the read or write processing is carried out. The GCNT value saved in the GCNT counter 638 is a sum total of the read and write processings for all the addresses in the guarantee area. Thus, unless an external attacker accesses to the external memory 60 to falsify the data string, the GCNT value should be "0" in Step S805. Accordingly, if the GCNT value is not "0" in Step S805 (NO in Step S805), the controller 501 judges that the data were falsified (Step S808) and ends the processing.

On the other hand, if the GCNT value is "0" in Step S805 (YES in Step S805), the register value comparing section 637 judges whether or not the register values of the R register 634 and the W register 635 are in agreement (Step S806). By the read and write processings during the execution of the program, the register value of the W register 635 is so renewed as to correspond to a latest data string saved in the external memory 60. However, the register value of the R register 634 is renewed only up to the data string correspond to the one previous read or write processing.

Thus, the register value of the R register 634 is so renewed as to correspond to the latest data string saved in the external memory 60. Therefore; unless an external attacker accesses the external memory 60 to falsify the data string, the register values of the R register 634 and the W register 635 should agree in Step S806. Accordingly, if the register values are at variance in Step S806 (NO in Step S806), the controller 501 judges that the data were falsified (Step S808) and ends the processing. On the other hand, if the register values are in agreement (YES in Step S806), the controller 501 judges that the data were not falsified and normally ends the processing (Step S807).

As described above, according to this embodiment, the falsification of the data string is judged based on whether or not the GCNT value is "0" in Step S805. However, the present invention is not limited thereto. When the execution of the program is completed, the CNT values at all the addresses of the guarantee area may be added and the falsification of the data string may be judged based on whether or not this value and the GCNT value are in agreement.

Further, since the common key cryptosystem is used instead of performing an operation using a unidirectional function such as a hash function and writing the operation result in the external memory 60 in this embodiment, the processing can be carried out at a higher speed and a memory capacity can be saved.

Furthermore, according to all the embodiments described above, a microprocessor having less hardware and capable of checking the validity of the content written in the external memory at a higher speed as compared to the architecture such as the AEGIS can be realized.

Other Preferable Embodiments (A) In the fourth and fifth embodiments described above, the attacker can detect the number of accesses through the read and write processings for each address by observing data buses, address buses, memory control signals, etc. coming out from the chip of the CPU. In such a case, the attacker can observe and record a plurality of data having the identical WRC value, but different MAC values if the WRC value overflows. Accordingly, it is possible to conduct such a replay attack as to replace a data saved beforehand with another data having a different MAC value, but the same WRC value when the WRC-value takes a certain value.

In order to prevent such a replay attack, not only "1", but also a random number generated by the random number generator 502 may be added to the count values (WC value and GWC value, or WRC value and GWRC value) every time a memory access is made. By setting the count values (WC value and GWC value, or WRC value and GWRC value) of the respective addresses to have the same bit width, the count values overflow to the same extent at the same timing even if the overflow occurs. Thus, the count values can be consistent.

(B) In the fourth and fifth embodiments described above, the number of reading from or writing in the external memory 60 is counted as the WC value or the WRC value. In such a case, the WC value or the WRC value continues to increase if a cache algorithm is poor or an execution time is long. However, if 32 bits are allotted for the WC value or the WRC value, it is difficult to think that this value overflows. However, even in the case of the overflow, it can be dealt with by generating a new key in the key generator 503, renewing the MAC values contained in the data strings in the guarantee area using this key, and saving these MAC values in the external memory 60.

(C) In the sixth embodiment described above, the data and the count value (CNT value) are written in the guarantee area of the external memory 60. In such a case, the following attack (order shuffling attack) is possible when an attacker can predict a state of a cache error which can occur in the future by a certain measure.

First, original transactions between the program executing section 40 and the external memory 60 are assumed to be {d_0, c_0}, {d_1, c_1}, {d_2, c_2}, {d_3, c_3}. Here, it is assumed that d_0, d_1, d_2, d_3 denote data and c_0, c_1, c_2, c_3 denote CNT values. It is further assumed that the attacker could predict the next transaction {d_2, c_2} to appear at an external bus when the transaction {d_1, c_1} appears at this external bus. At this time, if the attacker shuffles the order of {d_1, c_1}, {d_2, c_2}, the entire transactions become {d_0, c_0}, {d_2, c_2}, {d_1, c_1}, {d_3, c_3}.

In this way, upon such an attack as to predict a data and a CNT value which will appear in the future and shuffle the order of the transactions, the sum total of the CNT values and the GCNT value become equal while the values of the R register 634 and the W register 635 are kept in agreement at the time of ending the secure mode. Thus, the controller 501 cannot detect the data falsification by the attacker. In order to prevent such an attack, it is thought to add the output value (SCR value) of the scramble function operating section 630 instead of merely adding "1" upon incrementing the values of the CNT counter 633 and the GCNT counter 638.

Figure 25:
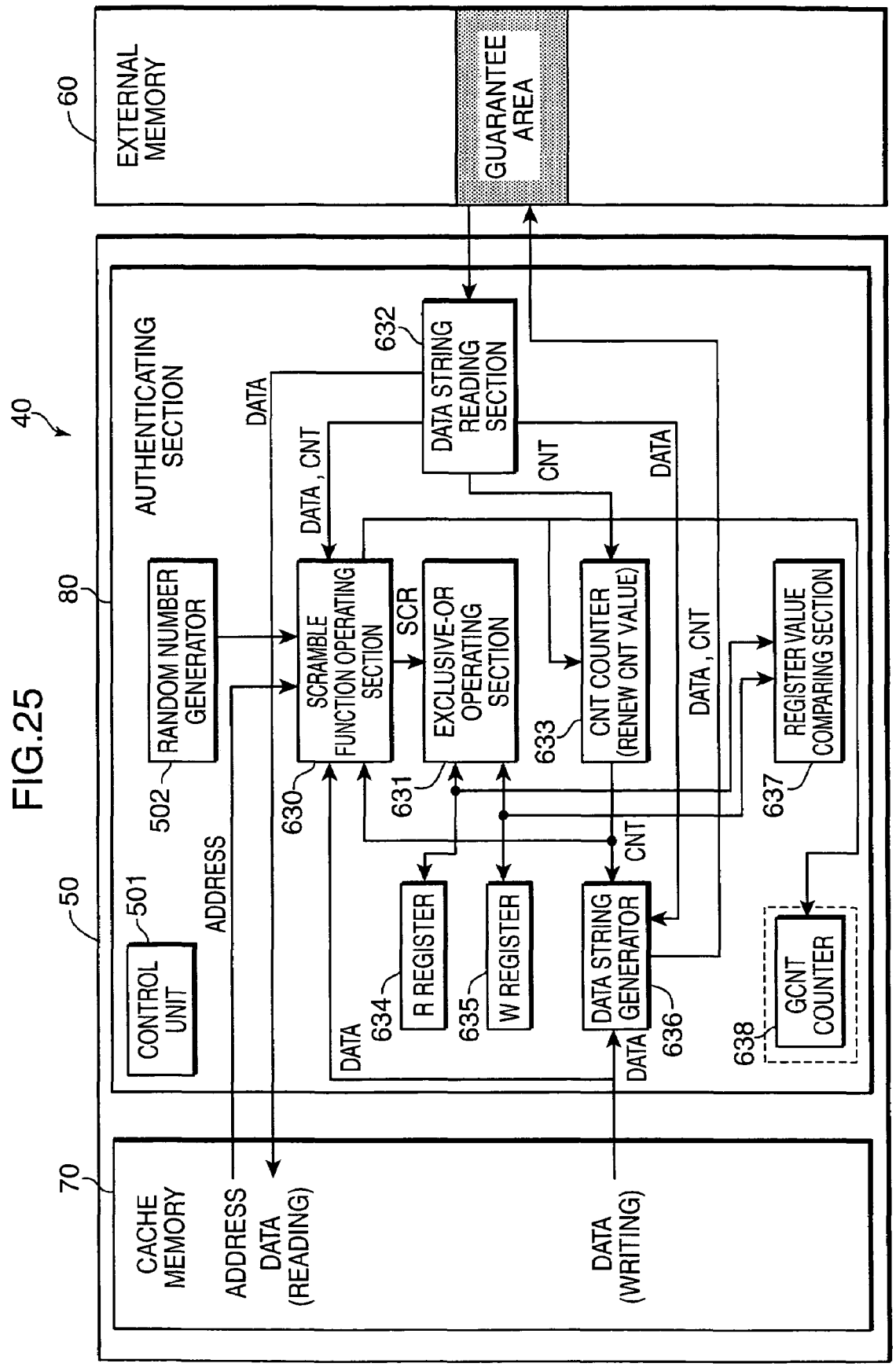
FIG. 25 is a function block diagram showing a program executing section according to a modification of the sixth embodiment in detail.

FIG. 25 is a function block diagram showing a program executing section 40 according to this embodiment in detail. In addition to the construction of the foregoing sixth embodiment shown in FIG. 21, a SCR value (or a specific part thereof) from the scramble function operating section 630 can be sent to the CNT counter 633 and the GCNT counter 638 in FIG. 25. In this embodiment as well, read and write processings similar to those of the sixth embodiment described with reference to FIGS. 22 and 23 are carried out. However, in this embodiment, the SCR value from the scramble function operating section 630 is added upon incrementing the CNT value in Steps S603 and S703 and upon incrementing the GCNT value in Steps S606 and 706, and the values after the addition are outputted as output values.

At this time, the SCR value from the scramble function operating section 630 may be added as it is, but in order to suppress the overflow of the CNT value and the GCNT value, it is preferable to add a specific part of the SCR value. More preferably, the specific part of the SCR value from the scramble function operating section 630 is added to the CNT value and the GCNT value, and the values of the R registers 634 and the W register 635 are renewed using a different specific part.

Specifically, in the case of an AES using a scramble function having a length of, e.g. 192 bits, the first 128 bits may be sent to the R register 634 and the W register 635, and the remaining 64 bits may be sent to the CNT counter 633 and the GCNT counter 638. However, this embodiment is not limited to this example. Any arrangement will do unless the value sent to the R register 634 and the W register 635 is completely in agreement with the value sent to the CNT counter 633 and the GCNT counter 638. These can be realized by internally or externally providing the scramble function operating section 630 with a function section of extracting the specific parts of the SCR value sent to the CNT counter 633, the GCNT counter 638, the R register 634 and the W register 635 from the scramble function operating section 630.

As described above, according to this embodiment, the CNT value and the GCNT value change every time the read processing from the external memory 60 or the write processing in the external memory 60 is carried out. If the value sent to the R register 634 and the W register 635 and the value sent to the CNT counter 633 and the GCNT counter 638 differ, the attacker cannot predict the values of the R register 634 and the W register 635 based on a difference between the CNT values or the like written in the external memory 60. Therefore, the order shuffling attack of the attacker can be prevented while keeping the values of the R register 634 and the W register 635 in agreement.

Outline of Embodiments (1) A microprocessor is a microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside, comprising: first storage means for saving a program transmitted from the server terminal, processing means for executing the program saved in the first storage means, first unidirectional function operating means for operating the program executed by the processing means using a specified first unidirectional function when the execution of the program is completed, secret key storage means for saving a secret key peculiar to the node terminal and used in a public key cryptosystem, signature executing means for digitally signing the program operated using the first unidirectional function and an execution result of the program obtained from the processing means, using the secret key saved in the secret key storage means, and transmitting means for transmitting the program and the execution result of the program digitally signed by the digital signature executing means as the result information.

With this construction, the program transmitted from the server terminal is saved in the first storage means provided in the microprocessor of the node terminal and executed by the processing means. When the execution of the program is completed, the program is operated using the specified unidirectional function by the first unidirectional function operating means. Here, the unidirectional function is such a function that output values largely differ if input values differ even by one bit and it is, in fact, impossible to obtain an input value from an output value. Further, the program operated using the unidirectional function and the execution result of the program are digitally signed in accordance with the public key cryptosystem by the signature executing means, and are transmitted to the server terminal by the transmitting means.

Accordingly, if the program before the transmission is operated using the same unidirectional function in the server terminal as well, whether or not the program executed in the node terminal is certainly the one transmitted from the server terminal can be verified. Digital signing may be applied to a collection of the program and the execution result of the program or may be independently applied to the program and the execution result of the program. Here, the secret key saved in the secret key storage means is protected by the tamper resistance of the microprocessor and cannot be known to others. Further, the server terminal which transmitted the program can get the public key corresponding to this secret key.

It is possible to transmit not the program itself executed in the microprocessor, but the operation result of the program using the unidirectional function to the server terminal. Since a small difference between input values is outputted as a large difference with the unidirectional function, whether or not the program executed in the node terminal is certainly the one transmitted from the server terminal can be easily verified if the program before the transmission is similarly operated using the same unidirectional function. Further, since the digital signature is made using the secret key peculiar to the node terminal in accordance with the public key cryptosystem, it becomes possible to safely deliver the public key to the server terminal and to prove the certain execution of the program in the designated node terminal.

(2) A microprocessor is a microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside, comprising: first storage means for saving a program transmitted from the server terminal, processing means for executing the program saved in the first storage means, first unidirectional function operating means for operating the program executed by the processing means and an execution result of the program using a specified first unidirectional function when the execution of the program is completed, secret key storage means for saving a secret key peculiar to the node terminal and used in a public key cryptosystem, signature executing means for digitally signing the program and an execution result of the program operated using the first unidirectional function, using the secret key saved in the secret key storage means, and transmitting means for transmitting an execution result of the program obtained from the processing means, and the program and the execution result of the program digitally signed by the digital signature executing means as the result information.

With this construction, the program transmitted from the server terminal is saved in the first storage means provided in the microprocessor of the node terminal and executed by the processing means. When the execution of the program is completed, the program and the execution result of the program are operated using the specified unidirectional function by the first unidirectional function operating means. Here, the unidirectional function is such a function that output values largely differ if input values differ even by one bit and it is, in fact, impossible to obtain an input value from an output value. Further, the program and the execution result of the program operated using the unidirectional function are digitally signed in accordance with the public key cryptosystem by the signature executing means, and are transmitted to the server terminal by the transmitting means.

Accordingly, if the program before the transmission and the execution result of the program received from the node terminal are operated using the same unidirectional function in the server terminal as well, whether or not the program executed in the node terminal is certainly the one transmitted from the server terminal can be verified. Digital signing may be applied to a collection of the program and the execution result of the program or may be independently applied to the program and the execution result of the program. The transmitting means also transmits the execution result of the program obtained from the processing means, which execution result is not digitally signed, to the server terminal. Here, the secret key saved in the secret key storage means is protected by the tamper resistance of the microprocessor and cannot be known to others. Further, the server terminal which transmitted the program can get the public key corresponding to this secret key.

It is possible to transmit not the program itself executed in the microprocessor, but the operation result of the program and the execution result of the program using the unidirectional function to the server terminal. Since a small difference between input values is outputted as a large difference with the unidirectional function, whether or not the program executed in the node terminal is certainly the one transmitted from the server terminal can be easily verified if the program before the transmission and the execution result of the program received from the node terminal are similarly operated using the same unidirectional function. Further, since the digital signature is made using the secret key peculiar to the node terminal in accordance with the public key cryptosystem, it becomes possible to safely deliver the public key to the server terminal and to prove the certain execution of the program in the designated node terminal.

(3) A microprocessor is the microprocessor (1) or (2), wherein the microprocessor is connectable with second storage means provided in the node terminal and capable of transferring data to and from at least a guarantee area which is a predesignated address range of the second storage means, and further comprises: third storage means capable of transferring data to and from the guarantee area of the second storage means, key generating means for generating a key used upon an operation using a specified second unidirectional function, function value calculating means for receiving data sent from the third storage means and calculating a function value as an operation result of the data by the second unidirectional function using the key generated by the key generating means, data string generating means for compiling the data sent from the third storage means and the function value of the data calculated by the function value calculating means into one and generating a data string encrypted using a common key cryptosystem, writing means for writing the data string generated by the data string generating means at a designated address of the guarantee area, reading means for reading the data string from the designated address of the guarantee area, decrypting means for decrypting the data string read by the reading means using the common key cryptosystem, and verifying means for comparing the function value contained in the data string read by the reading means and decrypted by the decrypting means and the function value, calculated by the function value calculating means, of the data contained in the data string read by the reading means, and judging that the read data string is not falsified if the two function values are in agreement.

With this construction, the tamper-resistant microprocessor is connectable with the guarantee area in the second storage means. Here, the guarantee area is an area for guaranteeing that data saved in this area are not falsified. The microprocessor further comprises the third storage means capable of transferring data to and from the guarantee area of the second storage means. This third storage means may be the first storage means or an empty memory area of the first storage means or may be provided separately from the first storage means. In order to prove that the data saved in the guarantee area are not falsified, not only the data, but also function values of the data calculated by the function value calculating means for operating the data using the specified second unidirectional function are saved. The data and the function value of the data are compiled into one and saved in the guarantee area by the writing means after being encrypted.

Accordingly, if the data string is falsified, not only the data contained in this data string, but also the function value is rewritten. Upon reading the data string from the guarantee area, the data string is decrypted by the decrypting means after being read by the reading means, and then the function value contained in the data string is sent to the verifying means. The verifying means receives the function value as an operation result of the data contained in this data string using the second unidirectional function from the function value calculating means, and judges whether or not the data is falsified by comparing these two function values.

Although the second storage means provided outside the microprocessor is not protected by the tamper resistance, whether or not the data is falsified can be effectively and securely verified through a comparison using the function values since not the data, but an addition of the data and the function value as an operation result of the data using the specified unidirectional function is saved in the second storage means.

(4) A microprocessor is the microprocessor (3), further comprising random number generating means for generating a random number, wherein the key generating means receives an address of the guarantee area where the data sent from the third storage means is to be written from the third storage means, and generates the key based on the received address and the random number generated by the random number generating means.

With this construction, the key generating means generates the key corresponding to the address within the guarantee area where the data sent from the third storage means is to be saved, and sends it to the function value calculating means. In other words, the function value is calculated by the function value calculating means using a different key for each address. Accordingly, even for the same data string, the key differs if the address differs. Thus, the correct key corresponding to the data string cannot be obtained in the case of unjust overwriting with the data string at a different address in the guarantee area. Therefore, the function value contained in the read data string and the function value calculated for the data contained in the read data string using a new key are at variance, and the verifying means judges that the data string is falsified.

In the case of such a falsification as to overwrite a data string at a different address with the one saved at a certain address of the second storage means, an incorrect key is generated since the overwritten data string is saved at the address different from the original one. Thus, the function value contained in the read data and the one calculated using the new key do not agree. Therefore, the falsification of the data can be effectively and securely verified.

(5) A microprocessor is the microprocessor (3) or (4), further comprising first counting means for counting the number of writing operations that the writing means made in the guarantee area for each address of the guarantee area, wherein the data string generating means compiles the data sent from the third storage means, the function value of this data calculated by the function value calculating means, and the number of the writing operations counted by the first counting means into one and generates a data string encrypted using the common key cryptosystem, and the microprocessor further comprises: second counting means for counting a sum total of the writing operations the writing means made in the second storage means, first count value adding means for adding the numbers of the writing operations the writing means made in the guarantee area and contained in the data strings read from the guarantee area by the reading means and decrypted by the decrypting means for all the addresses within the guarantee area, thereby calculating the sum total of the numbers of the writing operations, when the execution of the program is completed, and first count value verifying means for comparing the sum total of the numbers of the writing operations calculated by the first count value adding means and the sum total of the writing operations counted by the second counting means, and judging that the read data is not falsified if these two sum totals are in agreement.

With this construction, the number of the writing operations the writing means made in the guarantee area is counted for each address by the first counting means. When the data is written in the guarantee area by the writing means, this number is compiled with the data and the function value of this data into one data string and encrypted by the data string generating means, and then the encrypted data string is written. Accordingly, if the data string saved in the guarantee area is falsified, this number comes to take a value different from the original value. When the execution of the program is completed, the first count value adding means adds the numbers of the writing operations saved in the guarantee area for all the addresses within the guarantee area to calculate a sum total thereof. Separately, a sum total of the writing operations the writing means made in the guarantee area for all the addresses is counted by the second counting means. The first count value verifying means compares the sum total received from the first count value adding means with the one received from the second counting means, and judges that the data are not falsified if these sum totals are in agreement.

Even in the case of such a falsification as to overwrite a data string saved at a certain address of the second storage means with the one previously saved at this address, the correct data string and the overwritten data string differ in the number of the writing operations the writing means made in the second storage means for these data strings. Therefore, the numbers of the writing operations contained in these data strings differ and the falsification of the data string can be effectively and securely verified.

(6) A microprocessor is the microprocessor (3) or (4), wherein: the writing means is so constructed as to write a data string after the reading means reads a data string from the guarantee area, the microprocessor further comprises third counting means for counting the number of reading operations the reading means made from the guarantee area for each address of the guarantee area, the data string generating means compiles the data sent from the third storage means, the function value of this data calculated by the function value calculating means and the number of the reading operations counted by the third counting means into one, and generates a data string encrypted using the common key cryptosystem, and the microprocessor further comprises: fourth counting means for counting a total sum of the reading operations the reading means made from the second storage means, second count value adding means for adding the numbers of the reading operations the reading means made from the guarantee area and contained in the data string read from the guarantee area by the reading means and decrypted by the decrypting means for all the addresses within the guarantee area, thereby calculating a total sum of the numbers of the reading operations, when the execution of the program is completed, and second count value verifying means for comparing the sum total of the numbers of the reading operations calculated by the second count value adding means and the sum total of the reading operations counted by the second counting means, and judging that the read data is not falsified if these two sum totals are in agreement.

With this construction, the number of the reading operations the reading means made from the guarantee area is counted for each address by the third counting means. When the data is read from the guarantee area by the reading means, this number is compiled with the data and the function value of this data into one data string and encrypted by the data string generating means, and then written. Accordingly, if the data string saved in the guarantee area is falsified, this number comes to take a value different from the original value. When the execution of the program is completed, the second count value adding means adds the numbers of the reading operations made from the guarantee area for all the addresses within the guarantee area to calculate a sum total thereof. Separately, a sum total of the reading operations the reading means made from the guarantee area for all the addresses is counted by the fourth counting means. The second count value verifying means compares the sum total received from the second count value adding means with the one received from the fourth counting means, and judges that the data are not falsified if these sum totals are in agreement.

Even in the case of such a falsification as to overwrite a data string saved at a certain address of the second storage means with a data string previously saved at this address and overwrite this false data string at this address with the correct data string before the execution of the program is completed, the correct data string and the overwritten data string differ in the number of the reading operations the reading means made from the second storage means for these data strings. Therefore, the numbers of the reading operations contained in these data strings differ and the falsification of the data can be effectively and securely verified.

(7) A microprocessor is the microprocessor (1) or (2), wherein the microprocessor is connectable with second storage means provided in the node terminal and capable of transferring data at least to and from a guarantee area which is a predesignated address range of the second storage means, and further comprises: third storage means capable of transferring data to and from the guarantee area, write history storage means for saving history information of data strings written in the guarantee area, read history storage means for saving history information of data strings read from the guarantee area, reading means for reading a data string from a designated address of the guarantee area, decrypting means for decrypting the data string read by the reading means using a common key cryptosystem, third counting means for counting the number of reading operations the reading means made from the guarantee area for each address of the guarantee area, fourth counting means for counting a sum total of the reading operations the reading means made from the guarantee area, random number generating means for generating a random number, scramble function calculating means for generating an encrypted data by performing a specified encryption to the data string received from the decrypting means and the address where the received data string was saved, using a random number received from the random number generating means, exclusive-or operating means for performing an exclusive-or operation of the encrypted data received from the scramble function calculating means and the history information received from the read history storage means, and saving the operation result in the read history storage means, data string generating means for compiling the number of the reading operations received from the third counting means and either the data sent from the third storage means if a writing operation is instructed or the data read from the guarantee area if a reading operation is instructed into one, and generating a data string encrypted using the common key cryptosystem, and writing means for writing the data string generated by the data string generating means at a designated address of the guarantee area, wherein: the writing means is so constructed as to read a data string after the reading means reads a data string from the guarantee area, the exclusive-or operating means further performs an exclusive-or operation of: the data encrypted, in the scramble function operating means, for: either the data sent from the third storage means if a writing operation is instructed or the data read from the guarantee area if a reading operation is instructed, the number of the reading operations received from the third counting means, and the address where the data was saved or is to be written, and the history information received from the write history storage means, and saves the operation result in the write history storage means, when the execution of the program is completed, a processing of reading a data string from an address within the guarantee area by the reading means, decrypting the data string by the decrypting means, encrypting the data string and the address where this data string was saved are encrypted by the scramble function operating means, renewing the content of the read history storage means by the exclusive-or operating means and consequently subtracting the number of the reading operations contained in the data string from the sum total saved in the fourth counting means is carried out for all the addresses within the guarantee area, and the microprocessor further comprises: count value judging means for judging whether or not the sum total saved in the fourth counting means is zero, history comparing means for judging whether or not the saved contents of the read history storage means and the write history storage means are in agreement, and judging means for judging that the data strings saved in the guarantee area during the execution of the program are not falsified if the sum total is judged to be zero by the count value judging means and the saved contents of the read history storage means and the write history storage means are judged to be in agreement by the history comparing means.

Since the common key cryptosystem is used instead of an operation using a unidirectional function such as a hash function and writing an operation result in the second storage means, processing can be performed at a higher speed and a memory capacity can be saved.

(8) A microprocessor is the microprocessor (1) or (2), wherein the microprocessor is connectable with second storage means provided in the node terminal and capable of transferring data at least to and from a guarantee area which is a predesignated address range of the second storage medium, and further comprises: third storage medium capable of transferring data to and from the guarantee area, write history storage medium for saving history information of data strings written in the guarantee area, read history storage medium for saving history information of data strings read from the guarantee area, reading means for reading a data string from a designated address of the guarantee area, decrypting means for decrypting the data string read by the reading means using a common key cryptosystem, random number generating means for generating a random number, scramble function operating means for generating an encrypted data by performing a specified encryption to the data string received from the decrypting means and the address where the received data string was saved, using the random number received from the random number generating means as a key, third counting means for adding at least a specified part of the encrypted data generated by the scramble function operating means to a value inputted for each address and outputting the value after the addition as an output value for each address, fourth counting means for counting a sum total of the output values outputted by the third counting means, exclusive-or operating means for performing an exclusive-or operation of the encrypted data received from the scramble function operating means and the history information received from the read history storage medium and saving the operation result in the read history storage medium, data string generating means for compiling either the data sent from the third storage medium if a writing operation was instructed or the data read from the guarantee area if a reading operation was instructed and the output value received from the third counting means into one, and generating a data string encrypted using the common key cryptosystem, and writing means for writing the data string generated by the data string generating means at a designated address of the guarantee area, wherein: the writing means is so constructed as to write a data string after the reading means reads a data string from the guarantee area, the exclusive-or operating means further performs an exclusive-or operation of: the data encrypted, in the scramble function operating means, for: either the data sent from the third storage means if a writing operation is instructed or the data read from the guarantee area if a reading operation is instructed, the number of the reading operations received from the third counting means, and the address where the data was saved or is to be written, and the history information received from the write history storage means, and saves the operation result in the write history storage means, when the execution of the program is completed, a processing of reading a data string from an address within the guarantee area by the reading means; decrypting the read data string by the decrypting means; encrypting the decrypted data string and the address where this data string was saved by the scramble function operating means; updating the read history storage medium by the exclusive-or operating means; and consequently subtracting the output value included in the data string from the sum total of the output values saved in the fourth counting means is carried out for all the addresses within the guarantee area, the microprocessor further comprises: count value judging means for judging whether or not the sum total of the output values saved in the fourth storage medium is zero, history comparing means for judging whether or not saved contents of the read history storage medium and the write history storage medium are in agreement, and judging means for judging that the data strings saved within the guarantee area are not falsified during the execution of the program if the sum total of the output values is judged to be zero by the count value judging means and the saved contents of the read history storage medium and the write history storage medium are judged to agree by the history comparing means.

Since the output values of the third and fourth counting means change every time the reading is made from the second storage means or the writing is made in the second storage means, an attacker cannot predict the output values. Therefore, such an attack as to change an order of data to be written in the second storage means can be prevented.

(9) A node terminal, characterized by being network-connectable with at least one server terminal, receiving a program transmitted from the server terminal and executing the program by means of a microprocessor according to any one of (1) to (8).

With this construction, there can be realized a node terminal provided with a microprocessor capable of guaranteeing that the content of a memory is not unjustly falsified during the execution of a program.

By providing the microprocessor capable of guaranteeing that the content of the memory is not unjustly falsified during the execution of the program, there can be realized a node terminal capable of proving the execution of the program.

(10) A computer system, comprising: a server terminal for transmitting a program and instructing the execution of the program, and at least one node terminal according to (9) for transmitting result information including at least an execution result of the program to the server after executing the program received from the server terminal, the server terminal and the node terminal being network-connected, wherein the server terminal includes: public key storage means for saving a public key corresponding a secret key peculiar to the node terminal, signature verifying means for verifying a digital signature received from the node terminal using the public key saved in the public key storage means and extracting an operation result of the first unidirectional function operating means from the result information, second unidirectional function operating means for operating the program transmitted from the server terminal using the first unidirectional function, and comparing means for comparing an operation result of the second unidirectional function operating means and the operation result extracted by the signature verifying means and judging that the program was normally executed in the node terminal if these operation results are in agreement.

With this construction, after the program is executed in the node terminal, the operation result of the program using the first unidirectional function and the execution result of the program are transmitted to the server terminal after being digitally signed. The server terminal verifies the digital signature received from the node terminal by means of the signature verifying means upon receiving the result information from the node terminal. As a result, if the received digital signature is verified to be certainly the one of the designated node terminal, the signature verifying means extracts the operation result of the first unidirectional function operating means from the received result information, i.e. the operation result of the program executed in the node terminal using the first unidirectional function. Subsequently, the comparing means receives the operation result of the program transmitted from the server terminal using the first unidirectional function from the second unidirectional function operating means, and compares this operation result with the result extracted by the signature verifying means. The comparing means judges that the program was normally executed in the node terminal if these results are in agreement.

There can be realized a computer system capable of proving that a correct program received from a server terminal was certainly normally executed in a node terminal designated by the server terminal.

(11) A program execution proving method used in a computer system comprising a server terminal for transmitting a program and instructing the execution of the program, and at least one node terminal for transmitting result information including at least an execution result of the program to the server after executing the program received from the server terminal, the server terminal and the node terminal being network-connected, wherein: the node terminal comprises: a first saving step of saving the program transmitted from the server terminal, a processing step of executing the program saved in the first storage step, a first unidirectional function operating step of operating the program executed in the processing step using a specified first unidirectional function when the execution of the program is completed, a secret key saving step of saving a secret key peculiar to the node terminal and used in a public key cryptosystem, and an encrypting step of encrypting the program operated using the first unidirectional function and the execution result of the program, as a digital signature peculiar to the node terminal, using the secret key saved in the secret key saving step, and the server terminal comprises: a public key saving step of saving a public key corresponding to the secret key peculiar to the node terminal, a signature verifying step of verifying the digital signature received from the node terminal using the public key saved in the public key saving step, and extracting the operation result in the first unidirectional function operating step, a second unidirectional function operating step of operating the program transmitted from the server terminal using a specified first unidirectional function, and a comparing step of comparing the operation result in the second unidirectional function operating step and the operation result extracted in the signature verifying step and judging that the program was normally executed in the node terminal if these operation results are in agreement.

It becomes possible for a computer system, in which a server terminal and a node terminal are network-connected, to prove that a correct program received from the server terminal was certainly normally executed in the node terminal designated by the server terminal.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside, comprising:

first storage means for saving a program transmitted from the server terminal, processing means for executing the program saved in the first storage means, first unidirectional function operating means for operating the program executed by the processing means using a specified first unidirectional function when the execution of the program is completed, secret key storage means for saving a secret key peculiar to the node terminal and used in a public key cryptosystem, signature executing means for digitally signing the program operated using the first unidirectional function and an execution result of the program obtained from the processing means, using the secret key saved in the secret key storage means, and transmitting means for transmitting the program and the execution result of the program digitally signed by the digital signature executing means as the result information, wherein the microprocessor is connectable with second storage means provided in the node terminal and capable of transferring data to and from at least a guarantee area which is a predesignated address range of the second storage means, and further comprises:

third storage means capable of transferring data to and from the guarantee area of the second storage means, key generating means for generating a key used upon an operation using a specified second unidirectional function, function value calculating means for receiving data sent from the third storage means and calculating a function value as an operation result of the data by the second unidirectional function using the key generated by the key generating means, data string generating means for compiling the data sent from the third storage means and the function value of the data calculated by the function value calculating means into one and generating a data string encrypted using a common key cryptosystem, writing means for writing the data string generated by the data string generating means at a designated address of the guarantee area, reading means for reading the data string from the designated address of the guarantee area, decrypting means for decrypting the data string read by the reading means using the common key cryptosystem, and verifying means for comparing the function value contained in the data string read by the reading means and decrypted by the decrypting means and the function value, calculated by the function value calculating means, of the data contained in the data string read by the reading means, and judging that the read data string is not falsified if the two function values are in agreement.

2. A microprocessor according to claim 1, further comprising random number generating means for generating a random number, wherein the key generating means receives an address of the guarantee area where the data sent from the third storage means is to be written from the third storage means, and generates the key based on the received address and the random number generated by the random number generating means.

3. A microprocessor according to claim 1, further comprising first counting means for counting the number of writing operations that the writing means made in the guarantee area for each address of the guarantee area, wherein the data string generating means compiles the data sent from the third storage means, the function value of this data calculated by the function value calculating means, and the number of the writing operations counted by the first counting means into one and generates a data string encrypted using the common key cryptosystem, and the microprocessor further comprises:

second counting means for counting a sum total of the writing operations the writing means made in the second storage means, first count value adding means for adding the numbers of the writing operations the writing means made in the guarantee area and contained in the data strings read from the guarantee area by the reading means and decrypted by the decrypting means for all the addresses within the guarantee area, thereby calculating the sum total of the numbers of the writing operations, when the execution of the program is completed, and first count value verifying means for comparing the sum total of the numbers of the writing operations calculated by the first count value adding means and the sum total of the writing operations counted by the second counting means, and judging that the read data is not falsified if these two sum totals are in agreement.

4. A microprocessor according to claim 1, wherein:

the writing means is so constructed as to write a data string after the reading means reads a data string from the guarantee area, the microprocessor further comprises third counting means for counting the number of reading operations the reading means made from the guarantee area for each address of the guarantee area, the data string generating means compiles the data sent from the third storage means, the function value of this data calculated by the function value calculating means and the number of the reading operations counted by the third counting means into one, and generates a data string encrypted using the common key cryptosystem, and the microprocessor further comprises:

fourth counting means for counting a total sum of the reading operations the reading means made from the second storage means, second count value adding means for adding the numbers of the reading operations the reading means made from the guarantee area and contained in the data string read from the guarantee area by the reading means and decrypted by the decrypting means for all the addresses within the guarantee area, thereby calculating a total sum of the numbers of the reading operations, when the execution of the program is completed, and second count value verifying means for comparing the sum total of the numbers of the reading operations calculated by the second count value adding means and the sum total of the reading operations counted by the second counting means, and judging that the read data is not falsified if these two sum totals are in agreement.

5. A node terminal, characterized by being network-connectable with at least one server terminal, receiving a program transmitted from the server terminal and executing the program by means of a microprocessor according to claim 1.

6. A computer system, comprising:
a server terminal for transmitting a program and instructing the execution of the program, and
at least one node terminal according to claim 5 for transmitting result information including at least an execution result of the program to the server after executing the program received from the server terminal, the server terminal and the node terminal being network-connected,
wherein the server terminal includes: public key storage means for saving a public key corresponding a secret key peculiar to the node terminal,
signature verifying means for verifying a digital signature received from the node terminal using the public key saved in the public key storage means and extracting an operation result of the first unidirectional function operating means from the result information,
second unidirectional function operating means for operating the program transmitted from the server terminal using the first unidirectional function, and
comparing means for comparing an operation result of the second unidirectional function operating means and the operation result extracted by the signature verifying means and judging that the program was normally executed in the node terminal if these operation results are in agreement.

7. A microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside, comprising:
first storage means for saving a program transmitted from the server terminal,
processing means for executing the program saved in the first storage means,
first unidirectional function operating means for operating the program executed by the processing means and an execution result of the program using a specified first unidirectional function when the execution of the program is completed,
secret key storage means for saving a secret key peculiar to the node terminal and used in a public key cryptosystem,
signature executing means for digitally signing the program and an execution result of the program operated using the first unidirectional function, using the secret key saved in the secret key storage means, and
transmitting means for transmitting an execution result of the program obtained from the processing means, and the program and the execution result of the program digitally signed by the digital signature executing means as the result information,
wherein the microprocessor is connectable with second storage means provided in the node terminal and capable of transferring data to and from at least a guarantee area which is a predesignated address range of the second storage means, and further comprises:
third storage means capable of transferring data to and from the guarantee area of the second storage means,
key generating means for generating a key used upon an operation using a specified second unidirectional function,
function value calculating means for receiving data sent from the third storage means and calculating a function value as an operation result of the data by the second unidirectional function using the key generated by the key generating means,
data string generating means for compiling the data sent from the third storage means and the function value of the data calculated by the function value calculating means into one and generating a data string encrypted using a common key cryptosystem,
writing means for writing the data string generated by the data string generating means at a designated address of the guarantee area,
reading means for reading the data string from the designated address of the guarantee area,
decrypting means for decrypting the data string read by the reading means using the common key cryptosystem, and
verifying means for comparing the function value contained in the data string read by the reading means and decrypted by the decrypting means and the function value, calculated by the function value calculating means, of the data contained in the data string read by the reading means, and judging that the read data string is not falsified if the two function values are in agreement.

8. A microprocessor according to claim 7, further comprising random number generating means for generating a random number, wherein the key generating means receives an address of the guarantee area where the data sent from the third storage means is to be written from the third storage means, and generates the key based on the received address and the random number generated by the random number generating means.

9. A microprocessor according to claim 7, further comprising first counting means for counting the number of writing operations that the writing means made in the guarantee area for each address of the guarantee area, wherein
the data string generating means compiles the data sent from the third storage means, the function value of this data calculated by the function value calculating means, and the number of the writing operations counted by the first counting means into one and generates a data string encrypted using the common key cryptosystem, and the microprocessor further comprises:
second counting means for counting a sum total of the writing operations the writing means made in the second storage means,
first count value adding means for adding the numbers of the writing operations the writing means made in the guarantee area and contained in the data strings read from the guarantee area by the reading means and decrypted by the decrypting means for all the addresses within the guarantee area, thereby calculating the sum total of the numbers of the writing operations, when the execution of the program is completed, and
first count value verifying means for comparing the sum total of the numbers of the writing operations calculated by the first count value adding means and the sum total of the writing operations counted by the second counting means, and judging that the read data is not falsified if these two sum totals are in agreement.

10. A microprocessor according to claim 7, wherein:
the writing means is so constructed as to write a data string after the reading means reads a data string from the guarantee area, the microprocessor further comprises third counting means for counting the number of reading operations the reading means made from the guarantee area for each address of the guarantee area, the data string generating means compiles the data sent from the third storage means, the function value of this data calculated by the function value calculating means and the number of the reading operations counted by the third counting means into one, and generates a data string encrypted using the common key cryptosystem, and the microprocessor further comprises:

fourth counting means for counting a total sum of the reading operations the reading means made from the second storage means, second count value adding means for adding the numbers of the reading operations the reading means made from the guarantee area and contained in the data string read from the guarantee area by the reading means and decrypted by the decrypting means for all the addresses within the guarantee area, thereby calculating a total sum of the numbers of the reading operations, when the execution of the program is completed, and second count value verifying means for comparing the sum total of the numbers of the reading operations calculated by the second count value adding means and the sum total of the reading operations counted by the second counting means, and judging that the read data is not falsified if these two sum totals are in agreement.

11. A node terminal, characterized by being network-connectable with at least one server terminal, receiving a program transmitted from the server terminal and executing the program by means of a microprocessor according to claim 7.

12. A computer system, comprising:
a server terminal for transmitting a program and instructing the execution of the program, and
at least one node terminal according to claim 11 for transmitting result information including at least an execution result of the program to the server after executing the program received from the server terminal, the server terminal and the node terminal being network-connected,
wherein the server terminal includes:
public key storage means for saving a public key corresponding a secret key peculiar to the node terminal,
signature verifying means for verifying a digital signature received from the node terminal using the public key saved in the public key storage means and extracting an operation result of the first unidirectional function operating means from the result information,
second unidirectional function operating means for operating the program transmitted from the server terminal using the first unidirectional function, and
comparing means for comparing an operation result of the second unidirectional function operating means and the operation result extracted by the signature verifying means and judging that the program was normally executed in the node terminal if these operation results are in agreement.

13. A microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside, comprising:
first storage means for saving a program transmitted from the server terminal, processing means for executing the program saved in the first storage means, first unidirectional function operating means for operating the program executed by the processing means using a specified first unidirectional function when the execution of the program is completed, secret key storage means for saving a secret key peculiar to the node terminal and used in a public key cryptosystem, signature executing means for digitally signing the program operated using the first unidirectional function and an execution result of the program obtained from the processing means, using the secret key saved in the secret key storage means, and transmitting means for transmitting the program and the execution result of the program digitally signed by the digital signature executing means as the result information, wherein the microprocessor is connectable with second storage means provided in the node terminal and capable of transferring data at least to and from a guarantee area which is a predesignated address range of the second storage means, and further comprises:

third storage means capable of transferring data to and from the guarantee area, write history storage means for saving history information of data strings written in the guarantee area, read history storage means for saving history information of data strings read from the guarantee area, reading means for reading a data string from a designated address of the guarantee area, decrypting means for decrypting the data string read by the reading means using a common key cryptosystem, third counting means for counting the number of reading operations the reading means made from the guarantee area for each address of the guarantee area, fourth counting means for counting a sum total of the reading operations the reading means made from the guarantee area, random number generating means for generating a random number, scramble function calculating means for generating an encrypted data by performing a specified encryption to the data string received from the decrypting means and the address where the received data string was saved, using a random number received from the random number generating means, exclusive-or operating means for performing an exclusive-or operation of the encrypted data received from the scramble function calculating means and the history information received from the read history storage means, and saving the operation result in the read history storage means, data string generating means for compiling the number of the reading operations received from the third counting means and either the data sent from the third storage means if a writing operation is instructed or the data read from the guarantee area if a reading operation is instructed into one, and generating a data string encrypted using the common key cryptosystem, and writing means for writing the data string generated by the data string generating means at a designated address of the guarantee area, wherein:
the writing means is so constructed as to read a data string after the reading means reads a data string from the guarantee area, the exclusive-or operating means further performs an exclusive-or operation of:

the data encrypted, in the scramble function operating means, for:

either the data sent from the third storage means if a writing operation is instructed or the data read from the guarantee area if a reading operation is instructed, the number of the reading operations received from the third counting means, and the address where the data was saved or is to be written, and the history information received from the write history storage means, and saves the operation result in the write history storage means, when the execution of the program is completed, a processing of reading a data string from an address within the guarantee area by the reading means, decrypting the data string by the decrypting means, encrypting the data string and the address where this data string was saved are encrypted by the scramble function operating means, renewing the content of the read history storage means by the exclusive-or operating means and consequently subtracting the number of the reading operations contained in the data string from the sum total saved in the fourth counting means is carried out for all the addresses within the guarantee area, and the microprocessor further comprises:

count value judging means for judging whether or not the sum total saved in the fourth counting means is zero, history comparing means for judging whether or not the saved contents of the read history storage means and the write history storage means are in agreement, and judging means for judging that the data strings saved in the guarantee area during the execution of the program are not falsified if the sum total is judged to be zero by the count value judging means and the saved contents of the read history storage means and the write history storage means are judged to be in agreement by the history comparing means.

14. A microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside, comprising:

first storage means for saving a program transmitted from the server terminal, processing means for executing the program saved in the first storage means, first unidirectional function operating means for operating the program executed by the processing means and an execution result of the program using a specified first unidirectional function when the execution of the program is completed, secret key storage means for saving a secret key peculiar to the node terminal and used in a public key cryptosystem, signature executing means for digitally signing the program and an execution result of the program operated using the first unidirectional function, using the secret key saved in the secret key storage means, and transmitting means for transmitting an execution result of the program obtained from the processing means, and the program and the execution result of the program digitally signed by the digital signature executing means as the result information, wherein the microprocessor is connectable with second storage means provided in the node terminal and capable of transferring data at least to and from a guarantee area which is a predesignated address range of the second storage means, and further comprises:

third storage means capable of transferring data to and from the guarantee area, write history storage means for saving history information of data strings written in the guarantee area, read history storage means for saving history information of data strings read from the guarantee area, reading means for reading a data string from a designated address of the guarantee area, decrypting means for decrypting the data string read by the reading means using a common key cryptosystem, third counting means for counting the number of reading operations the reading means made from the guarantee area for each address of the guarantee area, fourth counting means for counting a sum total of the reading operations the reading means made from the guarantee area, random number generating means for generating a random number, scramble function calculating means for generating an encrypted data by performing a specified encryption to the data string received from the decrypting means and the address where the received data string was saved, using a random number received from the random number generating means, exclusive-or operating means for performing an exclusive-or operation of the encrypted data received from the scramble function calculating means and the history information received from the read history storage means, and saving the operation result in the read history storage means, data string generating means for compiling the number of the reading operations received from the third counting means and either the data sent from the third storage means if a writing operation is instructed or the data read from the guarantee area if a reading operation is instructed into one, and generating a data string encrypted using the common key cryptosystem, and writing means for writing the data string generated by the data string generating means at a designated address of the guarantee area, wherein:

the writing means is so constructed as to read a data string after the reading means reads a data string from the guarantee area, the exclusive-or operating means further performs an exclusive-or operation of:

the data encrypted, in the scramble function operating means, for:

either the data sent from the third storage means if a writing operation is instructed or the data read from the guarantee area if a reading operation is instructed, the number of the reading operations received from the third counting means, and the address where the data was saved or is to be written, and the history information received from the write history storage means, and saves the operation result in the write history storage means, when the execution of the program is completed, a processing of reading a data string from an address within the guarantee area by the reading means, decrypting the data string by the decrypting means, encrypting the data string and the address where this data string was saved are encrypted by the scramble function operating means, renewing the content of the read history storage means by the exclusive-or operating means and consequently subtracting the number of the reading operations contained in the data string from the sum total saved in the fourth counting means is carried out for all the addresses within the guarantee area, and the microprocessor further comprises:

count value judging means for judging whether or not the sum total saved in the fourth counting means is zero, history comparing means for judging whether or not the saved contents of the read history storage means and the write history storage means are in agreement, and judging means for judging that the data strings saved in the guarantee area during the execution of the program are not falsified if the sum total is judged to be zero by the count value judging means and the saved contents of the read history storage means and the write history storage means are judged to be in agreement by the history comparing means.

15. A microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside, comprising:

first storage means for saving a program transmitted from the server terminal, processing means for executing the program saved in the first storage means, first unidirectional function operating means for operating the program executed by the processing means using a specified first unidirectional function when the execution of the program is completed, secret key storage means for saving a secret key peculiar to the node terminal and used in a public key cryptosystem, signature executing means for digitally signing the program operated using the first unidirectional function and an execution result of the program obtained from the processing means, using the secret key saved in the secret key storage means, and transmitting means for transmitting the program and the execution result of the program digitally signed by the digital signature executing means as the result information, wherein the microprocessor is connectable with second storage means provided in the node terminal and capable of transferring data at least to and from a guarantee area which is a predesignated address range of the second storage medium, and further comprises:

third storage medium capable of transferring data to and from the guarantee area, write history storage medium for saving history information of data strings written in the guarantee area, read history storage medium for saving history information of data strings read from the guarantee area, reading means for reading a data string from a designated address of the guarantee area, decrypting means for decrypting the data string read by the reading means using a common key cryptosystem, random number generating means for generating a random number, scramble function operating means for generating an encrypted data by performing a specified encryption to the data string received from the decrypting means and the address where the received data string was saved, using the random number received from the random number generating means as a key, third counting means for adding at least a specified part of the encrypted data generated by the scramble function operating means to a value inputted for each address and outputting the value after the addition as an output value for each address, fourth counting means for counting a sum total of the output values outputted by the third counting means, exclusive-or operating means for performing an exclusive-or operation of the encrypted data received from the scramble function operating means and the history information received from the read history storage medium and saving the operation result in the read history storage medium, data string generating means for compiling either the data sent from the third storage medium if a writing operation was instructed or the data read from the guarantee area if a reading operation was instructed and the output value received from the third counting means into one, and generating a data string encrypted using the common key cryptosystem, and writing means for writing the data string generated by the data string generating means at a designated address of the guarantee area, wherein:

the writing means is so constructed as to write a data string after the reading means reads a data string from the guarantee area, the exclusive-or operating means further performs an exclusive-or operation of:

the data encrypted, in the scramble function operating means, for:

either the data sent from the third storage means if a writing operation is instructed or the data read from the guarantee area if a reading operation is instructed, the number of the reading operations received from the third counting means, and the address where the data was saved or is to be written, and the history information received from the write history storage means, and saves the operation result in the write history storage means, when the execution of the program is completed, a processing of reading a data string from an address within the guarantee area by the reading means; decrypting the read data string by the decrypting means; encrypting the decrypted data string and the address where this data string was saved by the scramble function operating means; updating the read history storage medium by the exclusive-or operating means; and consequently subtracting the output value included in the data string from the sum total of the output values saved in the fourth counting means is carried out for all the addresses within the guarantee area, the microprocessor further comprises:

count value judging means for judging whether or not the sum total of the output values saved in the fourth storage medium is zero, history comparing means for judging whether or not saved contents of the read history storage medium and the write history storage medium are in agreement, and judging means for judging that the data strings saved within the guarantee area are not falsified during the execution of the program if the sum total of the output values is judged to be zero by the count value judging means and the saved contents of the read history storage medium and the write history storage medium are judged to agree by the history comparing means.

16. A microprocessor provided in a node terminal network-connectable with at least one server terminal and, after executing a program received from the server terminal, capable of sending result information containing at least an execution result of the program to the terminal, and having a tamper resistance so that no direct access can be made thereto from the outside, comprising:

first storage means for saving a program transmitted from the server terminal, processing means for executing the program saved in the first storage means, first unidirectional function operating means for operating the program executed by the processing means and an execution result of the program using a specified first unidirectional function when the execution of the program is completed, secret key storage means for saving a secret key peculiar to the node terminal and used in a public key cryptosystem, signature executing means for digitally signing the program and an execution result of the program operated using the first unidirectional function, using the secret key saved in the secret key storage means, and transmitting means for transmitting an execution result of the program obtained from the processing means, and the program and the execution result of the program digitally signed by the digital signature executing means as the result information, wherein the microprocessor is connectable with second storage means provided in the node terminal and capable of transferring data at least to and from a guarantee area which is a predesignated address range of the second storage medium, and further comprises:

third storage medium capable of transferring data to and from the guarantee area, write history storage medium for saving history information of data strings written in the guarantee area, read history storage medium for saving history information of data strings read from the guarantee area, reading means for reading a data string from a designated address of the guarantee area, decrypting means for decrypting the data string read by the reading means using a common key cryptosystem, random number generating means for generating a random number, scramble function operating means for generating an encrypted data by performing a specified encryption to the data string received from the decrypting means and the address where the received data string was saved, using the random number received from the random number generating means as a key, third counting means for adding at least a specified part of the encrypted data generated by the scramble function operating means to a value inputted for each address and outputting the value after the addition as an output value for each address, fourth counting means for counting a sum total of the output values outputted by the third counting means, exclusive-or operating means for performing an exclusive-or operation of the encrypted data received from the scramble function operating means and the history information received from the read history storage medium and saving the operation result in the read history storage medium, data string generating means for compiling either the data sent from the third storage medium if a writing operation was instructed or the data read from the guarantee area if a reading operation was instructed and the output value received from the third counting means into one, and generating a data string encrypted using the common key cryptosystem, and writing means for writing the data string generated by the data string generating means at a designated address of the guarantee area, wherein:

the writing means is so constructed as to write a data string after the reading means reads a data string from the guarantee area, the exclusive-or operating means further performs an exclusive-or operation of:

the data encrypted, in the scramble function operating means, for:

either the data sent from the third storage means if a writing operation is instructed or the data read from the guarantee area if a reading operation is instructed, the number of the reading operations received from the third counting means, and the address where the data was saved or is to be written, and the history information received from the write history storage means, and saves the operation result in the write history storage means, when the execution of the program is completed, a processing of reading a data string from an address within the guarantee area by the reading means; decrypting the read data string by the decrypting means; encrypting the decrypted data string and the address where this data string was saved by the scramble function operating means; updating the read history storage medium by the exclusive-or operating means; and consequently subtracting the output value included in the data string from the sum total of the output values saved in the fourth counting means is carried out for all the addresses within the guarantee area, the microprocessor further comprises:

count value judging means for judging whether or not the sum total of the output values saved in the fourth storage medium is zero, history comparing means for judging whether or not saved contents of the read history storage medium and the write history storage medium are in agreement, and judging means for judging that the data strings saved within the guarantee area are not falsified during the execution of the program if the sum total of the output values is judged to be zero by the count value judging means and the saved contents of the read history storage medium and the write history storage medium are judged to agree by the history comparing means.

17. A program execution proving method used in a computer system comprising a server terminal for transmitting a program and instructing the execution of the program, and at least one node terminal for transmitting result information including at least an execution result of the program to the server after executing the program received from the server terminal, the server terminal and the node terminal being network-connected, wherein:

the node terminal comprises:

a first saving step of saving the program transmitted from the server terminal, a processing step of executing the program saved in the first storage step, a first unidirectional function operating step of operating the program executed in the processing step using a specified first unidirectional function when the execution of the program is completed, a secret key saving step of saving a secret key peculiar to the node terminal and used in a public key cryptosystem, and an encrypting step of encrypting the program operated using the first unidirectional function and the execution result of the program, as a digital signature peculiar to the node terminal, using the secret key saved in the secret key saving step, and the server terminal comprises:

a public key saving step of saving a public key corresponding to the secret key peculiar to the node terminal, a signature verifying step of verifying the digital signature received from the node terminal using the public key saved in the public key saving step, and extracting the operation result in the first unidirectional function operating step, a second unidirectional function operating step of operating the program transmitted from the server terminal using a specified first unidirectional function, and a comparing step of comparing the operation result in the second unidirectional function operating step and the operation result extracted in the signature verifying step and judging that the program was normally executed in the node terminal if these operation results are in agreement wherein:

the node terminal further comprises:

a second saving step of saving data in a guarantee area of storage means a key generating step of generating a key used upon an operation using a specified second unidirectional function, a function value calculating step of receiving the data from the storage means and calculating a function value as an operation result of the data by the second unidirectional function using the key generated in the key generating step, a data string generating step of compiling the data from the storage means and the function value of the data calculated in the function value calculating step into one and generating a data string encrypted using a common key cryptosystem, a writing step of writing the data string generated in the data string generating step at a designated address of the guarantee area, a reading step of reading the data string from the designated address of the guarantee area, a decrypting step of decrypting the data string read in the reading step using the common key cryptosystem, and a verifying step of comparing the function value contained in the data string read in the reading step and decrypted in the decrypting step and the function value, calculated in the function value calculating step, of the data contained in the data string read in the reading step, and judging that the read data string is not falsified if the two function values are in agreement.

\* \* \* \* \*